US012478663B2

(12) United States Patent
Csikos et al.

(10) Patent No.: US 12,478,663 B2
(45) Date of Patent: *Nov. 25, 2025

(54) USE OF BOTULINUM NEUROTOXIN IN THE TREATMENT OF SIALORRHEA

(71) Applicant: Merz Pharma GmbH & Co. KGaA, Frankfurt am Main (DE)

(72) Inventors: Janos Csikos, Frankfurt am Main (DE); Irena Pulte, Frankfurt am Main (DE); Michael Althaus, Osten (DE); Markus Krüer, Kelkheim (DE); Nico Wegener, Frankfurt am Main (DE)

(73) Assignee: Merz Pharma GmbH & Co. KGaA, Frankfurt am Main (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/054,407

(22) Filed: Nov. 10, 2022

(65) Prior Publication Data

US 2023/0270829 A1    Aug. 31, 2023

Related U.S. Application Data

(63) Continuation of application No. 16/893,799, filed on Jun. 5, 2020, now Pat. No. 11,529,398, which is a continuation of application No. 16/129,311, filed on Sep. 12, 2018, now Pat. No. 10,709,772, which is a continuation of application No. PCT/EP2018/056850, filed on Mar. 19, 2018.

(30) Foreign Application Priority Data

Mar. 24, 2017 (EP) ..................... 17162719

(51) Int. Cl.
*A61K 38/48* (2006.01)
*A61K 9/00* (2006.01)
*A61P 1/00* (2006.01)
*A61P 43/00* (2006.01)

(52) U.S. Cl.
CPC ........ *A61K 38/4893* (2013.01); *A61K 9/0019* (2013.01); *A61K 9/0053* (2013.01); *A61P 1/00* (2018.01); *A61P 43/00* (2018.01); *Y02A 50/30* (2018.01)

(58) Field of Classification Search
None
See application file for complete search history.

(56) References Cited

U.S. PATENT DOCUMENTS

| | | |
|---|---|---|
| 7,879,341 B2 | 2/2011 | Taylor |
| 8,372,645 B2 | 2/2013 | Taylor |
| 8,398,998 B2 | 3/2013 | Bigalke |
| 8,652,489 B2 | 2/2014 | Taylor |
| 9,050,367 B2 | 6/2015 | Taylor |
| 9,220,783 B2 | 12/2015 | Taylor |
| 10,105,421 B2 | 10/2018 | Taylor |
| 10,709,772 B2 | 7/2020 | Csikos |
| 11,529,398 B2 * | 12/2022 | Csikos ............. A61P 43/00 |
| 2006/0018931 A1 | 1/2006 | Taylor |
| 2009/0142430 A1 | 6/2009 | Sanders et al. |
| 2011/0091503 A1 | 4/2011 | Taylor |
| 2013/0121987 A1 | 5/2013 | Taylor |
| 2013/0317018 A1 * | 11/2013 | Philpot ............. C12N 15/635 435/375 |
| 2014/0105882 A1 | 4/2014 | Taylor |
| 2015/0119327 A1 * | 4/2015 | Muotri ............. A61K 48/00 435/7.1 |
| 2015/0231259 A1 | 8/2015 | Taylor |
| 2016/0074486 A1 | 3/2016 | Taylor |
| 2016/0151467 A1 | 6/2016 | Choi et al. |
| 2016/0202245 A1 | 7/2016 | Bruenn |
| 2017/0340823 A1 | 11/2017 | Vogt |
| 2018/0360995 A1 | 12/2018 | Bancel et al. |

FOREIGN PATENT DOCUMENTS

| | | | |
|---|---|---|---|
| WO | WO-9528171 A1 * | 10/1995 | ......... A61K 38/4893 |
| WO | 2005007185 A2 | 1/2005 | |
| WO | 2006020208 A2 | 2/2006 | |
| WO | 2009114748 A1 | 9/2009 | |
| WO | 2010013494 A1 | 2/2010 | |
| WO | 2013049508 A1 | 4/2013 | |
| WO | 2014207109 A1 | 12/2014 | |

OTHER PUBLICATIONS

Breheret, R., et al., "Ultrasound-guided botulinum toxin injections for treatment of drooling," European Annals of Otorhinolaryngology, Head and Neck diseases, (2011), vol. 128: 224-229.

Suskind, Dana L., et al., "Clinical Study of Botulinum—A Toxin in the Treatment of Sialorrhea in Children With Cerebral Palsy," Laryngoscope, (2002), vol. 112, No. 01: 73-81.

Castelnovo, Giovanni, et al., "Comparison of different sites of injections of incobotulinumtoxin (Xeomin®) into the major salivary glands in drooling," Movement Disorders, (2013), vol. 28: Abstract Supplement.

Jongerius, Peter H., et al., "Assessment of Salivary flow Rate: Biologic Variation and Measure Error," The Laryngoscope, (2004), vol. 114,: 1801-1804.

Likert, Rensis, "A Technique for the Measurement of Attitudes," Archives of Psychology, (1932), vol. 22 No. 140: 5-55.

Thomas-Stonell, Nancy, et al., "Three Treatment Approaches and Clinical Factors in the Reduction of Drooling," Dysphagia, (1988), vol. 3: 73-78.

(Continued)

*Primary Examiner* — Thea D'Ambrosio
(74) *Attorney, Agent, or Firm* — McBee Moore & Vanik IP, LLC

(57) ABSTRACT

This invention relates to improved uses of botulinum neurotoxins in the treatment of sialorrhea or diseases or conditions relating to increased saliva production. In particular are botulinum neurotoxins disclosed which are administered into parotid and submandibular glands in a dose ratio between 1.45 to 1 and 1.7 to 1.

12 Claims, 5 Drawing Sheets

Specification includes a Sequence Listing.

(56) References Cited

OTHER PUBLICATIONS

Kalf, Johanna G., et al., "Reproducibility and Validity of Patient-Rated Assessment of Speech, Swallowing, and Saliva Control in Parkinson's Disease," Arch. Phys. Med. Rehabil., (2011), vol. 92: 1152-1158.
Needleman, Saul B., et al., "A General Method Applicable to the Search for Similarities in the Amino Acid Sequence of Two Proteins," J. Mol. Biol., (1970), vol. 48: 443-453.
Smith, Temple F., et al., "Comparison of Biosequences," Advances in Applied Mathematics, (1981), vol. 2: 482-489.
Pearce, L. Bruce, et al., "Measurement of Botulinum Toxin Activity: Evaluation of the Lethality Assay," Toxicology and Applied Pharmacology, (1994), vol. 128: 69-77.
Dressler, Dirk, et al., "Mouse Diaphragm Assay for Detection of Antibodies Against Botulinum Toxin Type B," Movement Disorders, (2005), vol. 20, No. 12: 1617-1619.
Keller, J.E., "Recovery From Botulinum Neurotoxin Poisoning in Vivo," Neuroscience, (2006), pp. 1-9.
Mosseri, Ashley, et al., "Histopathologic Effects of Onabotulinum Toxin A Treatment in Pediatric Submandibular Glands," Otolaryngology—Headh and Neck Surgery, (2016), pp. 1-3.
Fujinaga, Y., et al., "A novel function of botulinum toxin-associated proteins: HA proteins disrupt intestinal epithelial barrier to increase toxin absorption," Toxicon, (2009), vol. 54: 583-586.
Sugawara, Yo, et al., "Botulinum hemagglutinin disrupts the intercellular epithelial barrier by directly binding E-cadherin," Journal of Cell Biology, (2010), vol. 189, No. 4: 691-700.
Lee, Kwangkook, et al., "Molecular basis for disruption of E-cadherin adhesion by botulinum neurotoxin A complex," Science, (2014), vol. 344, No. 6190: 1405-1410.
Davis, Michael A., et al., "Blocked Acinar Development, E-Cadherin Reduction, and Intraepithelial Neoplasia upon Ablation of p120-Catenin in the Mouse Salivary Gland," Developmental Cell, (2006), vol. 10: 21-31.
Baker, Olga J., "Tight Junctions in Salivary Epithelium," Journal of Biomedicine and Biotechnology, (2010), vol. 2010: 1-14.
Xu, H., et al., "Pre- and Post-synaptic Effects of Botulinum Toxin A on Submandibular Glands," Journal of Dental Research, (2015), vol. 94, No. 10: 1-9.
Shan, Xiao-Feng, et al., "Botulinum toxin A inhibits salivary secretion of rabbit submandibular gland," International Journal of Oral Science, (2013), vol. 5: 217-223.
Holsinger, F. Christopher, et al., "Anatomy, Function, and Evaluation of the Salivary Glands," Salivary Gland Disorders, (2007), pp. 1-16.
Howlett, D.C., "High resolution ultrasound assessment of the parotid gland," Br. J. Radiol., (2003), vol. 76, No. 904: 271-277.
Higgins, Desmond G., et al., "Fast and sensitive multiple sequence alignments on a microcomputer," Cabios Communications, (1989), vol. 5, No. 2: 151-153.
PCT International Search Report for PCT/EP2018/056850, mailed May 18, 2018.
Alvarenga, et al., "Botox—A injection of salivary glands for drooling," Journal of Pediatric Surgery, (2016), 1531-5037.
Barbero, et al., "Long-term follow-up of ultrasound-guided botulinum toxin-A injections for sialorrhea in neurological dysphagia," Journal Of Neurology, (2015), vol. 262, No. 12: 2662-2667.
Ellies, et al., "Successful Management of Drooling with Botulinum Toxin A in Neurologically Disabled Children," Neuropediatrics, (2002), vol. 33, No. 6: 327-330.
Wilken, et al., "Successful Treatment of Drooling in Children with Neurological Disorders with Botulinum Toxin A or B," Neuropediatrics, (2008), vol. 39, No. 4: 200-204.
Wu, et al.m "Botulinum Toxin Type A on Oral Health in Treating Sialorrhea in Children With Cerebral Palsy: A Randomized, Double-Blind, Placebo-Controlled Study," Journal of Child Neurology, (2011), vol. 26, No. 7: 838-843.
Tiigimäe-Saar Janne et al: "Does Botulinum neurotoxin type A treatment for sialorrhea change oral health?", Clinical Oral Investigations, (2017), vol. 21, No. 3: 795-800.
Porta, et al., "Treatment of sialorrhoea with ultrasound guided botulinum toxin type A injection in patients with neurological disorders," Journal of Neurology Neurosurgery and Psychiatry, (2001), vol. 70, No. 4: 538-540.
Narayanaswami, et al., "Drooling in Parkinson's disease: A randomized controlled trial of incobotulinum toxin A and meta-analysis of Botulinum toxins," Parkinsonism and Related Disorders, (2016), vol. 30: 73-77.
Kahl et al. Botulinum toxin as an effective treatment of clozapine-induced hypersalivation. Psychopharmacology. 2004, vol. 173, pp. 229-230. (Year: 2004).
Cardona et al. Effect of Recurrent Onabotulinum Toxin A Injection Into the Salivary Glands: An Ultrasound Measurement. The Laryngoscope. Oct. 2015, vol. 125, E328-E332. (Year. 2015).
Alvarenga et al. Botox—A injection of salivary glands for drooling. Journal of Pediatric Surgery. 2017, vol. 52, pp. 1283-1286. Epub = Oct. 14, 2016. (Year: 2016).
Dressler. Routine use of Xeomin in patients previously treated with Botox: long term results. European Journal of Neurology. 2009, vol. 16, Supplement 2, pp. 2-5. (Year: 2009).
Frevert et al. Complexing proteins in botulinum toxin type A drugs: a help or a hindrance? Biologics: Targets & Therapy. 2010, vol. 4, pp. 325-332. (Year: 2010).
Daughton et al. Lower-dose prescribing: Minimizing "side effects" of pharmaceuticals on society and the environment. Science of the Total Environment. 2013, vol. 443, pp. 324-337. (Year: 2013).
McCormack et al. Is bigger better? An argument for very low starting doses. Canadian Medical Association Journal. Jan. 11, 2011, vol. 183, No. 1, pp. 65-69. (Year: 2011).
S. Bellows & J. Jankovic, "Immunogenicity Associated with Botulinum Toxin Treatment", Toxins (11) 491 (pub. Aug. 26, 2019).
A. Lipp et al., "A randomized trial of botulinum toxin A for treatment of drooling", Neurology 2003 (61): 1279-1281.
E. Moeller et al., "Onabotulinumtoxin A Treatment of Drooling in Children with Cerebral Palsy: A Prospective, Longitudinal Open-Label Study", Toxins (7) 2481-2493 (pub. Jun. 30, 2015).
F. Scaglione, "Conversion Ratio between Botox, Dysport, and Xeomin in Clinical Practice", Toxins 2016 (8) 65 (pub. Mar. 4, 2016).
Zhijin, Li, et al. "Advances in the use of botulinum toxin A in the treatment of salivary gland diseases" Journal of Oral Science Research, 2012, vol. 28 issue 1, pp. 93-94, with English translation provided.

* cited by examiner

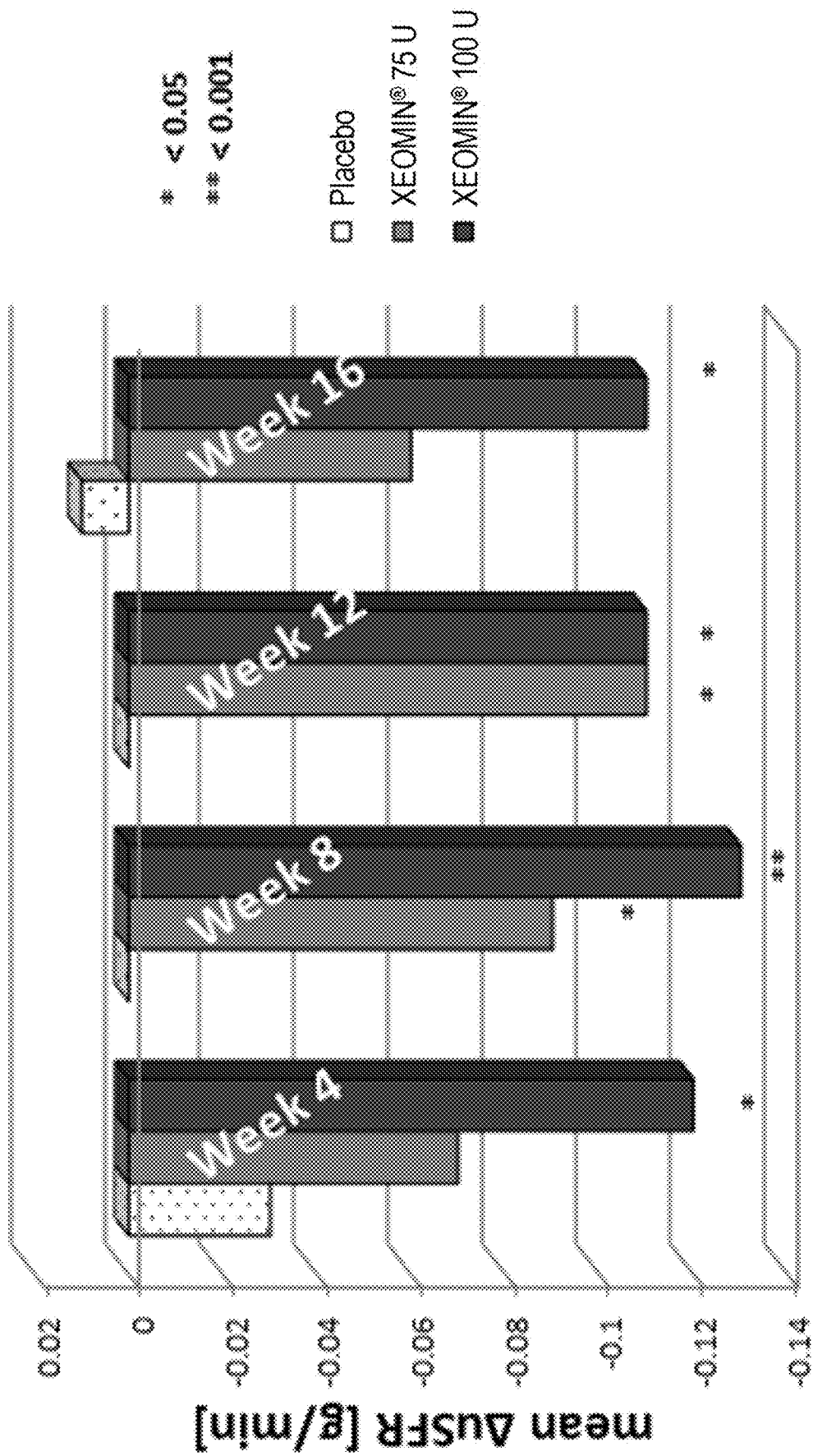
Figure 1: Mean reduction in objectively measured unstimulated Salivary Flow Rate (uSFR) from baseline (FAS)

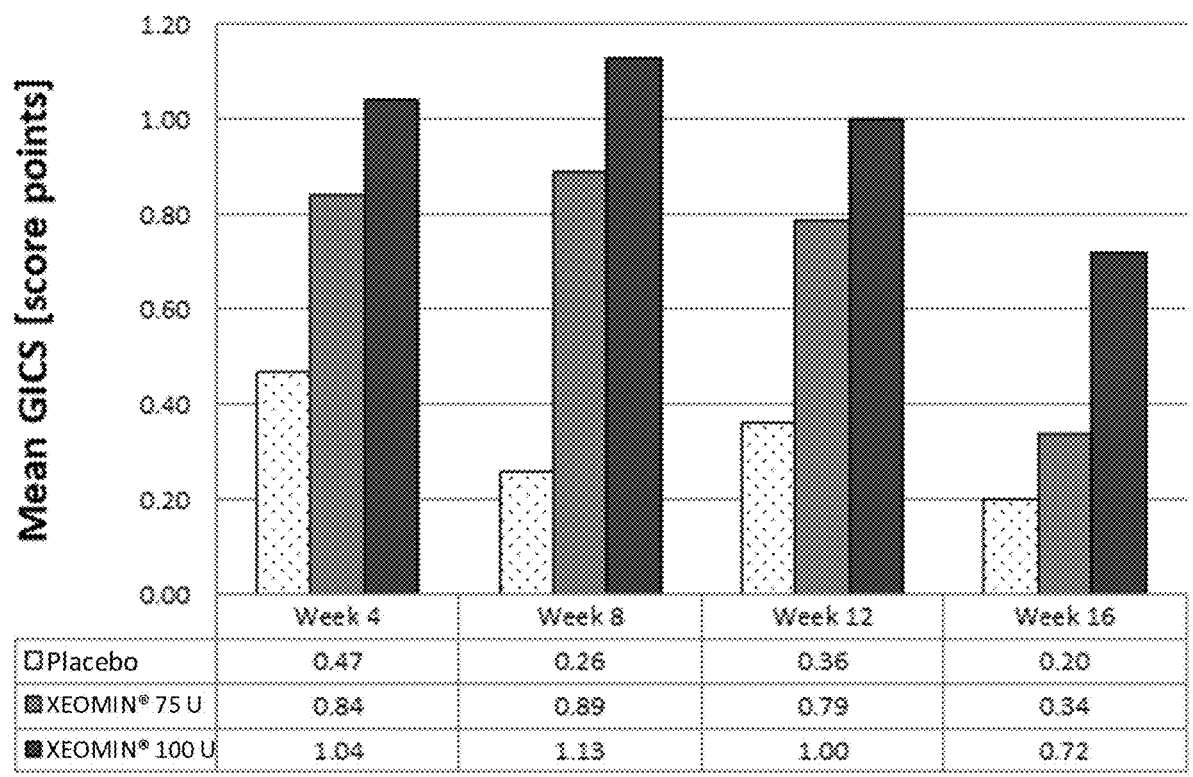
Figure 2: Mean Global Impression of Change Scale (GICS) (FAS)

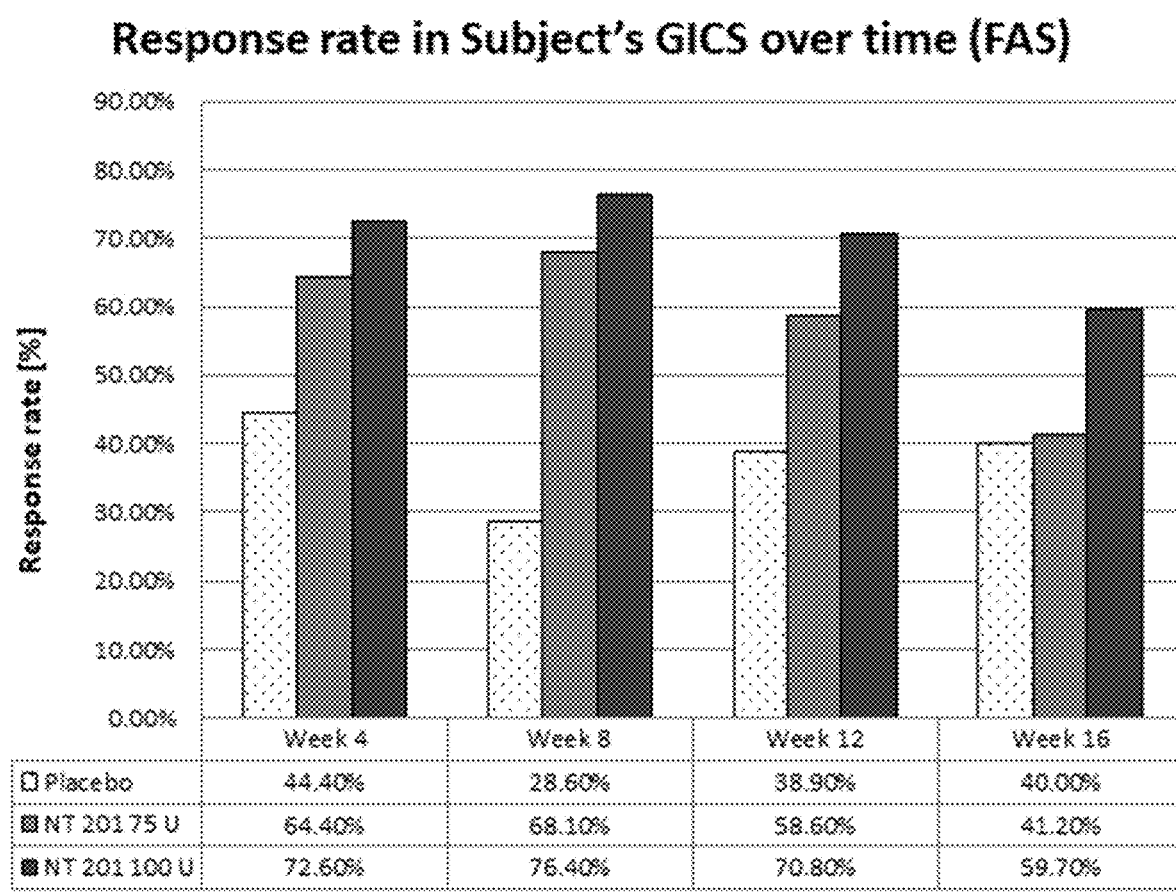
Figure 3: Response rate in Subject's GICS over time (FAS)

Figure 4: Mean reduction of Drooling Severity and Frequency Sum score (DSFS) from baseline (FAS)
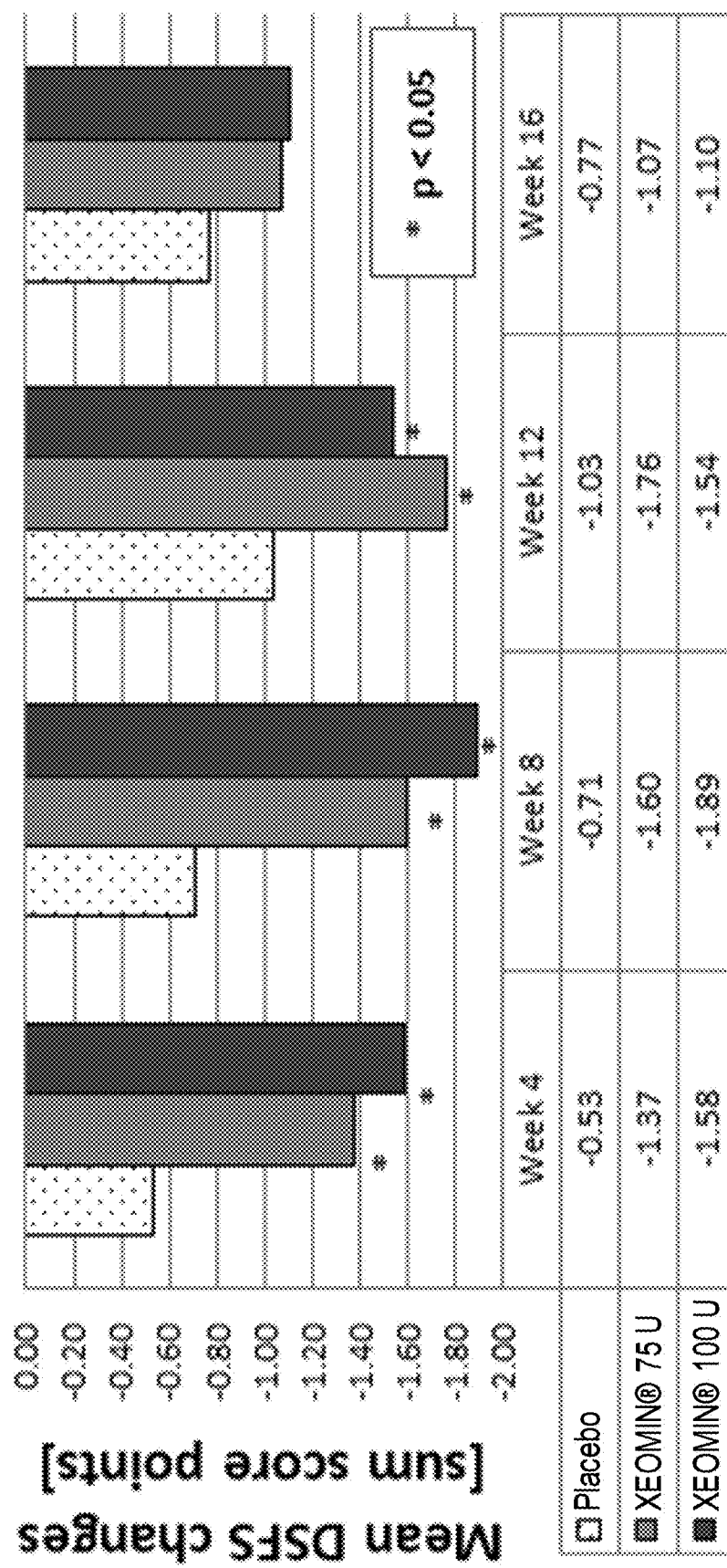

Figure 5: Mean mROMP drooling subscore reduction from baseline (FAS)
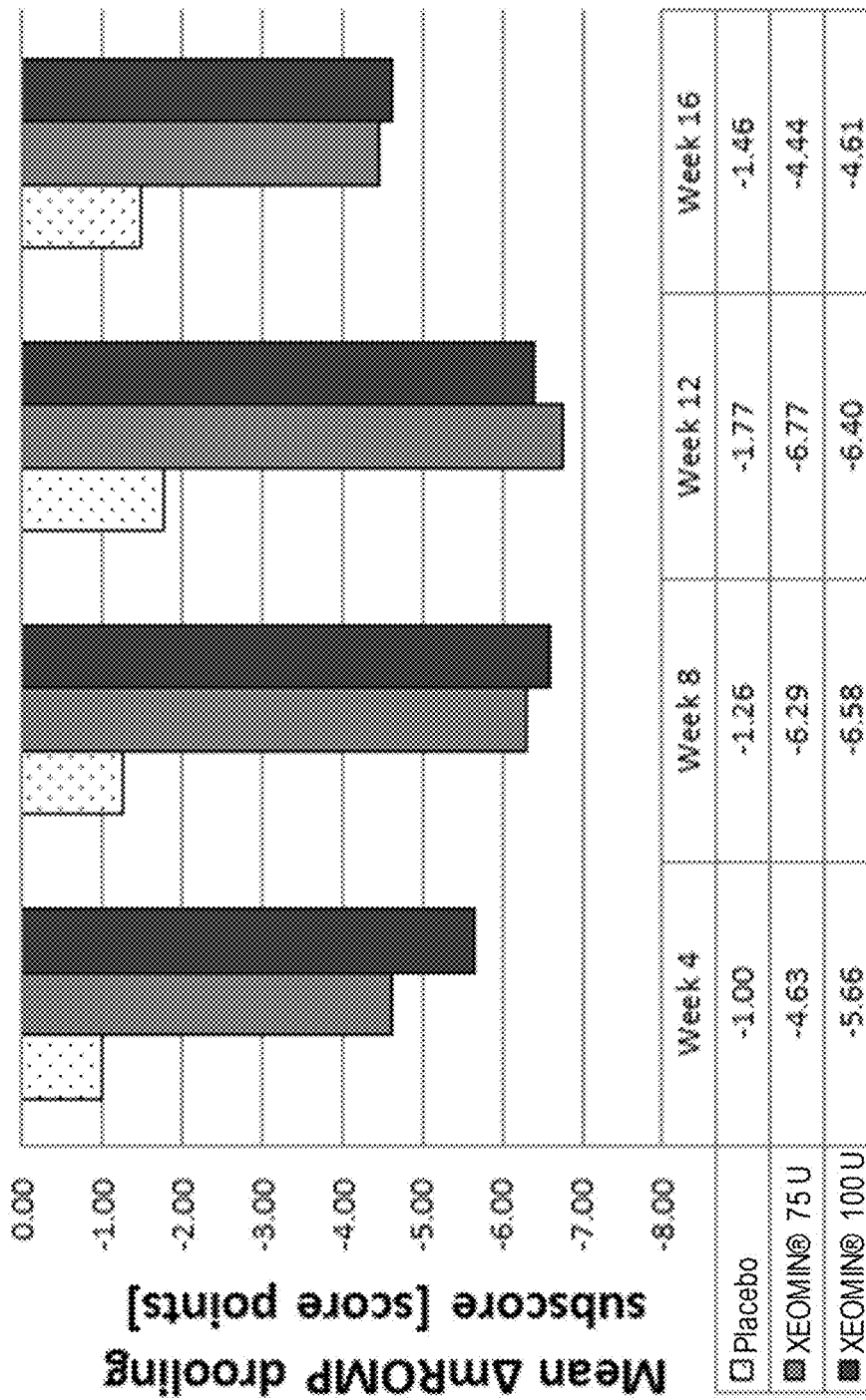

SEQUENCE LISTING

Sequence total quantity: 14
SEQ ID NO: 1                moltype = DNA   length = 3891
FEATURE                     Location/Qualifiers
source                      1..3891
                            mol_type = other DNA
                            organism = Clostridium botulinum
SEQUENCE: 1
atgccatttg ttaataaaca atttaattat aaagatcctg taaatggtgt tgatattgct   60
tatataaaaa ttccaaatgc aggacaaatg caaccagtaa aagcttttaa aattcataat  120
aaaatatggg ttattccaga aagagataca tttacaaatc ctgaagaagg agatttaaat  180
ccaccaccag aagcaaaaca agttccagtt tcatattatg attcaacata tttaagtaca  240
gataatgaaa aagataatta tttaaaggga gttacaaaat tatttgagag aatttattca  300
actgatcttg gaagaatgtt gttaacatca atagtaaggg gaataccatt tgggggtgga  360
agtacaatag atacagaatt aaaagttatt gatactaatt gtattaatgt gatacaacca  420
gatggtagtt atagatcaga agaacttaat ctagtaataa taggaccctc agctgatatt  480
atacagtttg aatgtaaaag cttttggaca gaagttttga atcttacgcg aaatggttat  540
ggctctactc aatacattag atttagccca gattttacat ttggttttga ggagtcactt  600
gaagttgata caaatcctct tttaggtgca ggcaaatttg ctacagatcc agcagtaaca  660
ttagcacatg aacttataca tgctggacat agattatatg gaatagcaat taatccaaat  720
agggttttta aagtaaatac taatgcctat tatgaaatga gtgggttaga agtaagcttt  780
gaggaactta gaacatttgg gggacatgat gcaaagttta gatagtttt acaggaaaac  840
gaatttcgtc tatattatta taatcagttt agagataagc caagtacact taatagagct  900
aaatcaatag taggtactac tgcttcatta cagtatatga aaaatgtttt taaagagaaa  960
tatctcctat ctgaagatac atctggaaaa ttttcggtag ataaattaaa atttgataag 1020
ttatacaaaa tgttaacaga gatttacaca gaggataatt tgttaagtt ttttaaagta 1080
cttaacagaa aaacatattt gaattttgat aaagccgtat ttaagataaa tatagtacct 1140
aaggtaaatt acacaatata tgatggattt aatttaagaa atacaaattt agcagcaaac 1200
tttaatggtc aaaatacaga aattaataat atgaatttta ctaaactaaa aaattttact 1260
ggattgtttg aatttttataa gttgctatgt gtaagaggga taataacttc taaaactaaa 1320
tcattagata aaggatacaa taaggcatta atgatttat gtatcaaagt taataattgg 1380
gacttgtttt ttagtccttc agaagataat tttactaatg atctaaataa aggagaagaa 1440
attacatctg atactaatat agaagcagca gaagaaaaaata ttagtttaga tttaatacaa 1500
caatattatt taacctttaa ttttgataat gaacctgaaa atatttcaat agaaaatctt 1560
tcaagtgaca ttataggcca attagaactt atgcctaata tagaaagatt tcctaatgga 1620
aaaaagtatg agttagataa atatactatg ttccattatc ttcgtgctca agaatttgaa 1680
catggtaaat ctaggattgc tttaacaaat tctgttaacg aagcattatt aaatcctagt 1740
cgtgtttata cattttttc ttcagactat gtaagaaaag ttaataaagc tacgaaggca 1800
gctatgtttt taggctgggt agaacaatta gtatatgatt ttaccgatga aactagcgaa 1860
gtaagtacta cggataaaat tgcggatata actataatta ttccatatat aggacctgct 1920
ttaaatatag gtaatatgtt atataaagat gattttgtag gtgctttaat attttcagga 1980
gctgttattc tgttagaatt tataccagag attgcaatac ctgtatgg tacttttgca 2040
cttgtatcat atattgcgaa taggttcta accgttcaaa caatagataa tgctttaagt 2100
aaaagaaatg aaaaatggga tgaggtctat aaatatatg taacaaattg gttagcaaag 2160
gttaatacac agattgatct aataagaaaa aaaatgaaag aagctttaga aaatcaagca 2220
gaagcaacaa aggctataat aaactatcag tataatcaat atactgagga agagaaaaat 2280
aatattaatt ttaatattga tgatttaagt tcgaaactta atgagtctat aaataaagct 2340
atgattaata taaaaatt tttgaatcaa tgctctgttt catatttaat gaattctatg 2400
atccctatg gtgttaaacg gttagaagat tttgatgcta gtcttaaaga tgcattatta 2460
aagtatatat atgataatag aggaacttta attggtcaag tagatagatt aaaagataaa 2520
gttaataata cacttagtac agatatacct tttcagcttt ccaaatacgt agataatcaa 2580
agattattat ctacatttac tgaatatatt aagaatatta ttaatacttc tatattgaat 2640
ttaagatatg aaagtaacca tttaatagac ttatctaggt atgcatcaaa aataaatatt 2700
ggtagtaaag taaattttga tccaatagat aaaaatcaaa ttcaattatt taattttaga 2760
agtagtaaaa ttgaggtaat tttaaaaaat gctattgtat ataatagtat gtatgaaaat 2820
tttagtacta gcttttggat aagaattcct aagtatttta acagtataag tctaaataat 2880
gaatatacaa taataaattg tatggaaaat aattcaggat ggaaagtatc acttaattat 2940

```
ggtgaaataa tctggacttt acaggatact caggaaataa aacaaagagt agttttttaaa 3000
tacagtcaaa tgattaatat atcagattat ataaacagat ggattttttgt aactatcact 3060
aataatagat taaataactc taaaatttat ataaatggaa gattaataga tcaaaaacca 3120
atttcaaatt taggtaatat tcatgctagt aataatataa tgtttaaatt agatggttgt 3180
agagatacac atagatatat ttggataaaa tattttaatc tttttgataa ggaattaaat 3240
gaaaaagaaa tcaaagattt atatgataat caatcaaatt caggtatttt aaaagacttt 3300
tggggtgatt atttacaata tgataaacca tactatatgt taaatttata tgatccaaat 3360
aaatatgtcg atgtaaataa tgtaggtatt agaggttata tgtatcttaa agggcctaga 3420
ggtagcgtaa tgactacaaa catttatttta aattcaagtt tgtataggggg gacaaaattt 3480
attataaaaa aatatgcttc tggaaataaa gataaattg ttagaaataa tgatcgtgta 3540
tatattaatg tagtagttaa aaataaagaa tataggttag ctactaatgc atcacaggca 3600
ggcgtagaaa aaatactaag tgcattagaa atacctgatg taggaaatct aagtcaagta 3660
gtagtaatga agtcaaaaaa tgatcaagga ataacaaata aatgcaaaat gaatttacaa 3720
gataataatg ggaatgatat aggctttata ggatttcatc agtttaataa tatagctaaa 3780
ctagtagcaa gtaattggta taatagacaa atagaaagat ctagtaggac tttgggttgc 3840
tcatgggaat ttattcctgt agatgatgga tggggagaaa ggccactgta a 3891

SEQ ID NO: 2           moltype = AA   length = 1296
FEATURE                Location/Qualifiers
source                 1..1296
                       mol_type = protein
                       organism = Clostridium botulinum
SEQUENCE: 2
MPFVNKQFNY KDPVNGVDIA YIKIPNAGQM QPVKAFKIHN KIWVIPERDT FTNPEEGDLN   60
PPPEAKQVPV SYYDSTYLST DNEKDNYLKG VTKLFERIYS TDLGRMLLTS IVRGIPFWGG  120
STIDTELKVI DTNCINVIQP DGSYRSEELN LVIIGPSADI IQFECKSFGH EVLNLTRNGY  180
GSTQYIRFSP DFTFGFEESL EVDTNPLLGA GKFATDPAVT LAHELIHAGH RLYGIAINPN  240
RVFKVNTNAY YEMSGLEVSF EELRTFGGHD AKFIDSLQEN EFRLYYYNKF KDIASTLNKA  300
KSIVGTTASL QYMKNVFKEK YLLSEDTSGK FSVDKLKFDK LYKMLTEIYT EDNFVKFFKV  360
LNRKTYLNFD KAVFKINIVP KVNYTIYDGF NLRNTNLAAN FNGQNTEINN MNFTKLKNFT  420
GLFEFYKLLC VRGIITSKTK SLDKGYNKAL NDLCIKVNNW DLFFSPSEDN FTNDLNKGEE  480
ITSDTNIEAA EENISLDLIQ QYYLTFNFDN EPENISIENL SSDIIGQLEL MPNIERFPNG  540
KKYELDKYTM FHYLRAQEFE HGKSRIALTN SVNEALLNPS RVYTFFSSDY VKKVNKATEA  600
AMFLGWVEQL VYDFTDETSE VSTTDKIADI TIIIPYIGPA LNIGNMLYKD DFVGALIFSG  660
AVILLEFIPE IAIPVLGTFA LVSYIANKVL TVQTIDNALS KRNEKWDEVY KYIVTNWLAK  720
VNTQIDLIRK KMKEALENQA EATKAIINYQ YNQYTEEEKN NINFNIDDLS SKLNESINKA  780
MININKFLNQ CSVSYLMNSM IPYGVKRLED FDASLKDALL KYIYDNRGTL IGQVDRLKDK  840
VNNTLSTDIP FQLSKYVDNQ RLLSTFTEYI KNIINTSILN LRYESNHLID LSRYASKINI  900
GSKVNFDPID KNQIQLFNLE SSKIEVILKN AIVYNSMYEN FSTSFWIRIP KYFNSISLNN  960
EYTIINCMEN NSGWKVSLNY GEIIWTLQDT QEIKQRVVFK YSQMINISDY INRWIFVTIT 1020
NNRLNNSKIY INGRLIDQKP ISNLGNIHAS NNIMFKLDGC RDTHRYIWIK YFNLFDKELN 1080
EKEIKDLYDN QSNSGILKDF WGDYLQYDKP YYMLNLYDPN KYVDVNNVGI RGYMYLKGPR 1140
GSVMTTNIYL NSSLYRGTKF IIKKYASGNK DNIVRNNDRV YINVVVKNKE YRLATNASQA 1200
GVEKILSALE IPDVGNLSQV VVMKSKNDQG ITNKCKMNLQ DNNGNDIGFI GFHQFNNIAK 1260
LVASNWYNRQ IERSSRTLGC SWEFIPVDDG WGERPL                          1296

SEQ ID NO: 3           moltype = DNA   length = 3876
FEATURE                Location/Qualifiers
source                 1..3876
                       mol_type = other DNA
                       organism = Clostridium botulinum
SEQUENCE: 3
atgccagtta caataaataa ttttaattat aatgatccta ttgataataa taatattatt   60
atgatggagc ctccatttgc gagaggtacg gggagatatt ataaagcttt taaaatcaca  120
gatcgtattt ggataaatac ggaaagatat acttttggat ataaacctga ggattttaat  180
aaaagttccg gtattttttaa tagagatgtt tgtgaatata tgatccaga ttacttaaat  240
actaatgata aaaagaatat attttttacaa caatgatca agttatttaa tagaatcaaa  300
tcaaaaccat tgggtgaaaa gttattagag atgattataa atggtatacc ttatcttgga  360
gatagacgtg ttccactcga agagtttaac acaaacattg ctagtgtaac tgttaataaa  420
ttaatcagta atccaggaga agtggagcga aaaaaaggta ttttcgcaaa tttaataata  480
tttggacctg ggcagttttt aaatgaaaat gagactatag atataggtat acaaaatcat  540
tttgcatcaa gggaaggctt cggggggtata atgcaaatga agttttgccc agaatatgta  600
agcgtattta taatgttca agaaaacaaa ggcgcaagta tatttaatag acgtggatat  660
ttttcagatc cagccttgat attaatgcat gaacttatac atgtttttaca tggattatat  720
ggcattaaag tagatgattt accaattgta ccaaatgaaa aaaaattttt tatgcaatct  780
acagatgcta tacaggcaga gaactatat acatttggag gacaagatcc cagcatcata  840
actcctttcta cggataaaag tatctatgat aaagttttgc aaaattttag agggatagtt  900
gatagactta caccaaggttt agtttgcata tcagatccta acattaatat taatatatat  960
aaaaataaat ttaaagataa atataaaattc gttgaagatt ctgagggaaa atatagtata 1020
gatgtagaaa gttttgataa attatataaa agcttaatgt ttggttttac agaaactaat 1080
atagcagaaa attataaaat aaaaactaga gcttcttatt ttagtgattc cttaccacca 1140
gtaaaaataa aaaatttatt agataatgaa atctatacta tagaggaagg gtttaatata 1200
tctgataaag atatggaaaa agaatataga ggtcagaata aagctataaa taaacaagct 1260
taaaaatta ttagcaagga gcatttggct gtatataaga tacaaatgtg taaaagtgtt 1320
aaagctccag gaatatgtat tgatgttgat aatgaagatt tgttcttttat agctgataaa 1380
aatagttttt cagatgattt atctaaaaac gaaagaatag aattaataac acagagtaat 1440
tatatagaaa atgacttccc tataaatgaa ttaattttag atactgatt taataagtaaa 1500
atagaattac aagtgaaaaa tacagaatca cttactgatt ttaatgtaga tgttccagta 1560
tatgaaaaac aacccgctat aaaaaaaatt tttacagatg aaaataccat ctttcaatat 1620
```

```
                                    -continued
ttatactctc agacatttcc tctagatata agagatataa gtttaacatc ttcatttgat 1680
gatgcattat tattttctaa caaagtttat tcattttttt ctatggatta tattaaaact 1740
gctaataaag tggtagaagc aggattattt gcaggttggg tgaaacagat agtaaatgat 1800
tttgtaatcg aagctaataa aagcaatact atggataaaa ttgcagatat atctctaatt 1860
gttccttata taggattagc tttaaatgta ggaaatgaaa cagctaaagg aaattttgaa 1920
aatgcttttg agattgcagg agccagtatt ctactagaat ttataccaga acttttaata 1980
cctgtagttg gagcctttttt attagaatca tatattgaca ataaaaataa aattattaaa 2040
acaatagata atgctttaac taaaagaaat gaaaaatgga gtgatatgta cggattaata 2100
gtagcgcaat ggctctcaac agttaatact caattttata caataaaaga gggaatgtat 2160
aaggcttttaa attatcaagc acaagcattg gaagaaataa taaaatacag atataatata 2220
tattctgaaa aagaaaagtc aaatattaac atcgattttta atgatataaa ttctaaactt 2280
aatgagggta ttaaccaagc tatagataat ataaataatt ttataaatgg atgttctgta 2340
tcatatttaa tgaaaaaaat gattccatta gctgtagaaa aattactaga ctttgataat 2400
actctcaaaa aaaatttgtt aaattatata gatgaaaata aattatattt gattggaagt 2460
gcagaatatg aaaaatcaaa agtaaataaa tacttgaaaa ccattatgcc gtttgatctt 2520
tcaatatata ccaatgatac aatactaata gaaatgttta taaatataa agcgaaatt 2580
ttaaatataaa ttatcttaaa tttaagatat aaggataata atttaataga tttatcagga 2640
tatgggcaa aggtagaggt atatgatgga gtcgagctta atgataaaaa tcaatttaaa 2700
ttaactagtt cagcaaatag taagattaga gtgactcaaa atcagaatat catatttaat 2760
agtgtgttcc ttgattttag cgttagcttt tggataagaa tacctaaata taagaatgat 2820
ggtatacaaa attatattca taatgaatat acaataatta attgtatgaa aaataattcg 2880
ggctgaaaa tatcttattag gggtaatagg ataatagga cttttaattga tataaatgga 2940
aaaaccaaat cggtattttt tgaatataac ataagagaag atatatcaga gtatataaat 3000
agatggtttt tgtaactat tactaataat ttgaataacg ctaaaattta tattaatggt 3060
aagctagaat caaatacaga tattaaagat ataagagaag ttattgctaa tggtgaaata 3120
atattttaaat tagatggtga tatagataga acacaattta tttggatgaa atattttcagt 3180
atttttaata cggaattaag tcaatcaaat attgaagaaa gatataaaat tcaatcatat 3240
agcgaatatt taaagatttt tggggaaat cctttaatgt acaataaaga atattatatg 3300
tttaatgcgg ggaataaaaa ttcatatatt aaactaaaga aagattcacc tgtaggtgaa 3360
attttaacac gtagcaaata taatcaaaat tctaaatata taaatatatat agattttat 3420
attggagaaa aatttattat aagaagaaag tcaattctc aatctataaa tgatgatata 3480
gttagaaaag aagattatat atatctagat ttttttaatt taaatcaaga gtggagagta 3540
tataccctata aatatttttaa gaaagaggaa gaaaaattgt ttttagctcc tataagtgat 3600
tctgatgagt tttacaatac tatacaaata aaagaatatg atgaacagcc aacatatagt 3660
tgtcagttgc ttttaaaaa agatgaagaa agtactgatg agataggatt gattggtatt 3720
catcgtttct acgaatctgg aattgtattt gaagagtata aagattatttt ttgtataagt 3780
aaatggtact aaaagaggt aaaaaggaaa ccatataatt taaaattggg atgtaattgg 3840
cagtttattc ctaaagatga agggtggact gaataa                           3876

SEQ ID NO: 4           moltype = AA   length = 1291
FEATURE                Location/Qualifiers
source                 1..1291
                       mol_type = protein
                       organism = Clostridium botulinum
SEQUENCE: 4
MPVTINNFNY NDPIDNNNII MMEPPFARGT GRYYKAFKIT DRIWIIPERY TFGYKPEDFN  60
KSSGIFNRDV CEYYDPDYLN TNDKKNIFLQ TMIKLFNRIK SKPLGEKLLE MIINGIPYLG 120
DRRVPLEEFN TNIASVTVNK LISNPGEVER KKGIFANLII FGPGPVLNEN ETIDIGIQNH 180
FASREGFGGI MQMKFCPEYV SVFNNVQENK GASIFNRRGY FSDPALILMH ELIHVLHGLY 240
GIKVDDLPIV PNEKKFFMQS TDAIQAEELY TFGGQDPSII TPSTDKSIYD KVLQNFRGIV 300
DRLNKVLVCI SDPNINIIIY KNKFKDKYKF VEDSEGKYSI SLMFGFTETN            360
IAENYKIKTR ASYFSDSLPP VKIKNLLDNE IYTIEEGFNI SDKDMEKEYR GQNKAINKQA 420
YEEISKEHLA VYKIQMCKSV KAPGICIDVD NEDLFFIADK NSFSDDLSKN ERIEYNTQSN 480
YIENDFPINE LILDTDLISK IELPSENTES LTDFNVDVPV YEKQPAIKKI FTDENTIFQY 540
LYSQTFPLDI RDISLTSSFD DALLFSNKVY SFFSMDYIKT ANKVVEAGLF AGWVKQIVND 600
FVIEANKSNT MDKIADISLI VPYIGLALNV GNETAKGNFE NAFEIAGASI LLEFIPELLI 660
PVVGAFLLES YIDNKNKIIK TIDNALTKRN EKWSDMYGLI VAQWLSVNT QFYTIKEGMY  720
KALNYQAQAL EEIIKYRYNI YSEKEKSNIN IDFNDINSKL NEGINQAIDN INNFINGCSV 780
SYLMKKMIPL AVEKLLDFDN TLKKNLLNYI DENKLYLIGS AEYEKSKVNK YLKTIMPFDL 840
SIYTNDTILI EMFNKYNSEI LNNIILNLRY KDNNLIDLSG YGAKVEVYDG VELNDKNQFK 900
LTSSANSKIR VTQNQNIIFN SVFLDFSVSF WIRIPKYKND GIQNYIHNEY TIINCMKNNS 960
GWKISIRGNR IIWTLIDING KTKSVFFEYN IREDISEYIN RWFFVTITNN LNNAKIYING 1020
KLESNTDIKD IREVIANGEI IFKLDGDIDR TQFIWMKYFS IFNTELSQSN IEERYKIQSY 1080
SEYLKDFWGN PLMYNKEYYM FNAGNKNSYI KLKKDSPVGE ILTRSKYNQN SKYINYRDLY 1140
IGEKFIIRRK SNSQSINDDI VRKEDYIYLD FFNLNQEWRV YTYKYFKKEE EKLFLAPISD 1200
SDEFYNTIQI KEYDEQPTYS CQLLFKKDEE STDEIGLIGI HRFYESGIVF EEYKDYFCIS 1260
KWYLKEVKRK PYNLKLGCNW QFIPKDEGWT E                                1291

SEQ ID NO: 5           moltype = DNA   length = 3843
FEATURE                Location/Qualifiers
source                 1..3843
                       mol_type = other DNA
                       organism = Clostridium botulinum
SEQUENCE: 5
atgccaataa caattaacaa ctttaattat tcagatcctg ttgataataa aaatattta   60
tatttagata tcattttaaa tacattagct aatgagcctg aaaaagcctt tcgcattata 120
gggaatatat gggtaatacc cgatagattt tcaagagatt ctaatccaaa tttaaataaa 180
cctcctcgag ttcaagcccc taaagtggt tattatgatc ctaattattt gagtactgat 240
tctgaaaaag atacatttttt aaaagaaatt ataaagttat ttaaaagaat taactctaga 300
```

-continued

```
gaaataggag aagaattaat atatagactt gcaacagaca tacccttcc tgggaataac    360
aatactccaa ttaatacttt tgattttgat gtagatttta acagtgttga tgttaaaact    420
agacaaggta acaactgggt taaaactggt agtataaatc ctagtgttat aataactgga    480
cctagagaaa acattataga cccagaaact tctacgttta aattaactaa caatactttt    540
gcggcacaag aaggatttgg tgctttatca ataatttcaa tatcacctag atttatgcta    600
acatatagta atgcaactaa taatgtagga gagggtagat tttctaagtc tgaattttgc    660
atggatccaa tactaatttt aatgcatgaa cttaatcatg caatgcataa tttatatgga    720
atagctatac caaatgatca aagaatttca tctgtaacta gtaatatttt ttattctcaa    780
tataaggtga aattagagta tgcagaaata tatgcatttg gaggtccaac tatagacctt    840
attcctaaaa gtgcaaggaa atattttgag gaaaaggcat tggattatta tagatccata    900
gctaaaagac ttaatagtat aactactgca aatccttcaa gctttaataa atatatagga    960
gaatataaac agaaacttat tagaaagtat agattcgtag tagaatcttc aggtgaagtt   1020
gcagtagatc gtaataagtt tgctgagtta tataaagaac ttacacaaat atttacagaa   1080
tttaactacg ctaaaatata taatgtacaa aataggaaaa tatatctttc aaatgtatat   1140
actccggtta cggcaaatat attagacgat aatgtttatg atatacaaaa tggatttaac   1200
ataccctaaaa gtaatttaaa tgtactattt atgggtcaaa atttatctcg aaatccagca   1260
ttaagaaaag tcaatcctga aaatatgctt tatttattta caaatttttg ccataaagca   1320
atagatggta gatcattata taataaaaca ttagattgta gagagcttt agttaaaaat   1380
actgacttac cctttatagg tgatattagt gatatcaaaa ctgatatatt tttaagcaaa   1440
gatattaatg aagaaactga agttatagac tatccggaca atgtttcagt ggatcaagtt   1500
attctcagta agaatacctc agaacatgga caactagatt tattataccc tattattgaa   1560
ggtgagagtc aagtattacc gggagagaat caagtcttta atgataatag aactcaaaat   1620
gttgattatt tgaattctta ttattaccta gaatctcaaa aactaagtga taatgttgaa   1680
gatttttactt ttacgacatc aattgaggaa gctttggata atgtggaaa agtatatact   1740
tacttttccta aactagctga taaagtaaat acggtgttc aaggtggttt atttttaatg   1800
tgggcaaatg atgtagttga agattttact acaaatattc taagaaaaga tacattagat   1860
aaaatatcag atgtatcagc tattattccc tatataggac ctgcattaaa tataagtaat   1920
tctgtaagaa ggggaaattt tactgaagca tttcagtta ccggtgtaac tattttatta   1980
gaagcgtttc aagaatttac aatacctgca cttggtgcat ttgtgattta tagtaaggtt   2040
caagaaagaa acgagattat taaaactata gataattgtt tagaacaaag gattaaaaga   2100
tggaaagatt catatgaatg gatgatagga acgtggttat ccaggattac tactcaatttt   2160
aataatataa gttatcaaat gtatgattct ttaaattatc aggcagatgc aatcaaagat   2220
aaaatagatt tagaatataa aaaatactca ggaagtgata agaaaatat aaaagtcaa   2280
gttgaaaatt taaaaaatag tttagatata aaaatctcgg agcaatgaa taatataaat   2340
aaatttatac gagaatgttc tgtaacatac ttatttaaaa atatgctccc taaagtaatt   2400
gatgaattaa ataagtttga tttaaaaact aaaacagaat taattaatct tatagatagt   2460
cataatatta ttctagttgg tgaagtagat agattaaaag caaagtaaa tgagagttt   2520
gaaaatacaa taccctttaa tatttttca tatactaata attctttatt aaaagatata   2580
attaatgaat atttcaatag tattaatgat tcaaaatttt tgagcttaca aacaaaaaa   2640
aatgctttag tggatacatc aggatataat gcagaagtga ggctagaagg tgatgttcaa   2700
gttaatacga tatatacaaa tgattttaaa ttaagtagtt caggagataa aatttatagta   2760
aatttaaata ataatatttt atatagcgct atttatgaga actctagtgt tagttttttgg   2820
attaagatat ctaaagattt aactaattct cataatgaat atacaaataat taatagtata   2880
aaacaaaatt ctgggtggaa attatgtatt aggaatggca atatagaatg gattttttacaa   2940
gatattaata gaaagtataa aagtttaatt tttgattata gtgaatcatt aagtcataca   3000
ggatatacaa ataaatggtt ttttgttact ataactaata atataatggg gtatatgaaa   3060
ctttatataa atggagaatt aaagcagagt gaaagattta aagatttaa tgaggttaag   3120
ttagataaaa ccatagtatt tggaatagat gagaatatag atgagaatca gatgctttgg   3180
attagagatt ttaatatttt ttctaaagaa ttaagcaatg aagatattaa tattgtatat   3240
gagggacaaa tattaagaaa tgttattaaa gattattggg gaaatccttt gaagtttgat   3300
acagaatatt atattattaa tgataattat atagataacc taaaagtaat   3360
atacttgtac ttgttcagta tccagataga tctaaattat atactggaaa tcctattact   3420
attaaatcag tatctgataa gaatcctat agtagaattt taaatggaga taatataatg   3480
tttcatatgt tatataatag tgggaaatat atgataataa gagatactga tacaatatat   3540
gcaatagaag gaagagagtg ttcaaaaat tgtgtatatg cattaaaatt acagagtaat   3600
ttaggtaatt atggtatagg tatatttagt ataaaaaata ttgtatctca aaataaaatat   3660
tgtagtcaaa ttttctctag ttttatgaaa aatacaatgc ttctagcaga tatatataaa   3720
ccttggagat tttcttttga aaatgcatac acgccagttg cagtaactaa ttatgagaca   3780
aaactattat caacttcatc ttttttggaaa tttatttcta gggatccagg atgggtagag   3840
taa                                                                 3843
```

SEQ ID NO: 6          moltype = AA   length = 1280
FEATURE               Location/Qualifiers
source                1..1280
                      mol_type = protein
                      organism = Clostridium botulinum
SEQUENCE: 6

```
MPITINNFNY SDPVDNKNIL YLDTHLNTLA NEPEKAFRII GNIWVIPDRF SRDSNPNLNK     60
PPRVTSPKSG YYDPNYLSTD SEKDTFLKEI IKLFKRINSR EIGEELIYRL ATDIPFPGNN    120
NTPINTFDFD VDFNSVDVKT RQGNNWVKTG SINPSVIITG PRENIIDPET STFKLTNNTF    180
AAQEGFGALS IISISPRFML TYSNATNNVG EGRFSKSEFC MDPILILMHE LNHAMHNLYG    240
IAIPNDQRIS SVTSNIFYSQ YKVKLEYAEI YAFGGPTIDL IPKSARKYFE EKALDYYRSI    300
AKRLNSITTA NPSSFNKYIG EYKQKLIRKY RFVVESSGEV AVDRNKFAEL YKELTQIFTE    360
FNYAKIYNVQ NRKIYLSNVY TPVTANILDD NVYDIQNGFN IPKSNLVLF MGQNLSRNPA    420
LRKVNPENML YLFTKFCHKA IDGRSLYNKT LDCRELLVKN TDLPFIGDIS DIKTDIFLSK    480
DINEETEVID YPDNVSVDQV ILSKNTSEHG QLDLLYPIIE GESQVLPGEN QVFYDNRTQN    540
VDYLNSYYYL ESQKLSDNVE DFTFTTSIEE ALDNSGKVYT YFPKLADKVN TGVQGGLFLM    600
WANDVVEDFT TNILRKDTLD KISDVSAIIP YIGPALNISS SVRRGNFTEA FAVTGVTILL    660
EAFQEFTIPA LGAFVIYSKV QERNEIIKTI DNCLEQRIKR WKDSYEWMIG TWLSRITTQF    720
```

| | | | | | |
|---|---|---|---|---|---|
| NNISYQMYDS | LNYQADAIKD | KIDLEYKKYS | GSDKENIKSQ | VENLKNSLDI | KISEAMNNIN | 780
| KFIRECSVTY | LFKNMLPKVI | DELNKFDLKT | KTELINLIDS | HNIILVGEVD | RLKAKVNESF | 840
| ENTIPFNIFS | YTNNSLLKDI | INEYFNSIND | SKILSLQNKK | NALVDTSGYN | AEVRLEGDVQ | 900
| VNTIYTNDFK | LSSSGDKIIV | NLNNNILYSA | IYENSSVSFW | IKISKDLTNS | HNEYTIINSI | 960
| KQNSGWKLCI | RNGNIEWILQ | DINRKYKSLI | FDYSESLSHT | GYTNKWFFVT | ITNNIMGYMK | 1020
| LYINGELKQS | ERIEDLNEVK | LDKTIVFGID | ENIDENQMLW | IRDFNIFSKE | LSNEDINIVY | 1080
| EGQILRNVIK | DYWGNPLKFD | TEYYIINDNY | IDRYIAPKSN | ILVLVQYPDR | SKLYTGNPIT | 1140
| IKSVSDKNPY | SRILNGDNIM | FHMLYNSGKY | MIIRDTDTIY | AIEGRECSKN | CVYALKLQSN | 1200
| LGNYGIGIFS | IKNIVSQNKY | CSQIFSSFMK | NTMLLADIYK | PWRFSFENAY | TPVAVTNYET | 1260
| KLLSTSSFWK | FISRDPGWVE | | | | | 1280

```
SEQ ID NO: 7          moltype = DNA   length = 3858
FEATURE               Location/Qualifiers
source                1..3858
                      mol_type = other DNA
                      organism = Clostridium botulinum
SEQUENCE: 7
atgacatggc cagtaaaaga ttttaattat agtgatcctg ttaatgacaa tgatatatta   60
tatttaagaa taccacaaaa taagttaatt actacacctg taaaagcttt tatgattact  120
caaaatattt gggtaatacc agaaagattt tcatcagata ctaatccaag tttaagtaaa  180
ccgcctagac ctacttcaaa gtatcaaagt tattatgatc ctagttattt atctactgat  240
gagcaaaaag atacatttt aaaagggatt ataaaattat ttaaaagaat taatgaaaga  300
gataggaa aaaattaat aaattattta gtagttggtt caccttttat gggagattca  360
agtacgcctg aagatacatt tgattttaca cgtcatacta ctaatattgc agttgaaaag  420
tttgaaaatg gtagttggaa agtaacaaat attataacac aagtgtatt gatatttgga  480
ccacttccta atatattaga ctatacagca tcccttacta tgcaaggaca acaatcaaat  540
ccatcatttg aagggtttgg aacattatct atactaaaag tagcacctga attttttgta  600
acatttagtg atgtaacatc taatcaaagt tcagctgtat taggcaaatc tatattttgt  660
atggatccag taatagcttt aatgcatgag ttaacacatt ctttgcatca attgtatgga  720
ataaatatac catctgataa aaggattcgt ccacaagtta gcgagggatt tttttctcaa  780
gatggaccca acgtacaatt tgaggaatta tacacatttg gaggatcaga tgttgaaata  840
atacctcaaa ttgaaagatt acaattaaga gaaaaagcat taggtcacta taagatata  900
gcgaaaagac ttaataatat taataaaact attccttcta gttggagtag taatatagat  960
aaatataaaa aatatttttc tgaaaagtat aattttgata aagataatac aggaaatttt 1020
gttgtaaata ttgataaatt caatagctta tattcagact tgactaatgt tatgtcaaa 1080
gttgtttatt cttcgcaata taatgttaaa aacaggactc attattttc aaagcattat 1140
ctacctgtat ttgcaaatat attagatgat aatatttata ctataataaa cggttttaat 1200
ttaacaacta aaggttttaa tatagaaaat tcgggtcaga atatagaaag gaatcctgca 1260
ctacaaaaac ttagttcaga aagtagtagt agatttgttta caaaagtagt tttaagatta 1320
acaagaaata gtagagatga ttcaacatgt attcaagtta aaaataatac attacctat 1380
gtagctgata agatagcat ttcacaagaa atatttgaaa gtcaaattat tacagatgag 1440
actaatgtag aaaattattc agataatttt tcattagatg aatctatttt agatgcaaaa 1500
gtccctacta atcctgaagc atagatcca ctgttaccaca atgttaatat ggaaccttta 1560
aatgttccag gtgaagaaga agtatttttat gatgatatta ctaaagatgt tgattattta 1620
aactctatt attatttgga agcccaaaaa ttaagtaata atgttgaaaaa tattactctt 1680
acaacttcag ttgaagaagc attaggttat agcaataaga tatacacatt tttacctagc 1740
ttagctgaaa aagtgaataa aggtgttcaa gcaggttat tcttaaattg ggcgaatgaa 1800
gtagttgagg attttactac aaatattatg aaaaaagata cattggataa aatatcagat 1860
gtatcagcca taattccata tataggacct gccttaaata taggaaattc agcattaagg 1920
ggaaacttta agcaagcatt tgcaacagct ggtgtagctt ttttgttaga aggattcca 1980
gagtttacaa taccctgcact cggtgtattt acctttata gttctattca agaaagagaa 2040
aaaattatta aaactataga aattgtttta gaacaaagag ttaagagatg gaaagattca 2100
tatcaatgga tggtatcaaa ttggttgtca agaattacta ctcgatttaa tcatataagt 2160
tatcaaatgt atgattcttt gagttatcag gcagatgcaa tcaaagctaa aatagattta 2220
gaatataaaa aatactcagg aagtgataaa gaaaatataa aaagtcaagt tgaaaattta 2280
aaaaaatagtt tagatgtaaa aatctcggaa gcaatgaata atataaatta atttatacga 2340
gaatgttctg taacatactt atttaaaaat atgctcccta agtaattga tgaattaaat 2400
aagtttgatt taaaaactaa aacagaatta attaatctta tagatagtca taatattatt 2460
ctagttggtg aagtagatag attaaaagca aaagtaaatg agagttttga aaatacaata 2520
cccttttaata ttttttcata tactaataat tctttattaa aagatatgat taatgaatat 2580
ttcaatagta ttaatgattc aaaaatttttg agcttacaaa ataaaaaaaa tactttgatg 2640
gatacatcag gatataacgc agaagtgaga gtagaaggca atgttcagct taatccaata 2700
tttccatttg actttaaatt aggtagttca ggggatgata gaggtaaagt tatagtaacc 2760
cagaatgaaa atattgtata taatgctatg tgaaagtt ttagtattag tttttggatt 2820
aggataaata aatgggtaag taatttaccct ggatatacta taattgatag tgttaaaaat 2880
aactcaggtt ggagtatagg tattattagt aattttttag tgtttacttt aaaacaaaat 2940
gaaaatagtg aacaagatat aaactttagt tatgatatat caagaatgc tgcgggtat 3000
aataaaggt ttttgtaac tattactacc aatatgatgg gaaatatgat gatttatata 3060
aatgaaaat taatagatac tataaaagtt aaagagttaa ctggaattaa ttttagcaaa 3120
actataacat ttcaaatgaa taaaattcca aatactggct taattacctc agattctgat 3180
aacatcaata tgtggataag ggatttttat atctttgcta agaattaga tgataaagat 3240
attaatatat atttaatag cttgcaatat actaatgttg taaagatta ttggggaaat 3300
gatttaagat atgataaaga atattcacatg attaacgtaa attatatgaa tagatatatg 3360
tctaaaaaag gcaatggaat tgtttttaat acacgtaaata cttcaatgaa 3420
ggatataaaa ttaataaaaa aagaattaga ggaaatacaa atgatactag agtacgagga 3480
gaaaatgtat tatattttaa tactacaatt gataacaaac aatatagttt aggtatgtat 3540
aaaccttcta gaaatctagg gactgattta gttccactag gtgcattgga tcaaccaatg 3600
gatgagatac gtaaatatgg ttcgtttata atacaaccat gcaatacttt tgattactat 3660
gcatcacaat tattttttgtc aagtaatgca acaacaaata ggcttggaat actatcaatt 3720
```

-continued

```
ggtagttata gtttcaaact tggagatgac tattggttta atcacgaata tttaattcct  3780
gttataaaaa tagagcatta tgcttcatta ttagaatcaa catcaactca ttgggttttt  3840
gtacctgcaa gtgaataa                                                3858

SEQ ID NO: 8              moltype = AA   length = 1285
FEATURE                   Location/Qualifiers
source                    1..1285
                          mol_type = protein
                          organism = Clostridium botulinum
SEQUENCE: 8
MTWPVKDFNY SDPVNDNDIL YLRIPQNKLI TTPVKAFMIT QNIWVIPERF SSDTNPSLSK   60
PPRPTSKYQS YYDPSYLSTD EQKDTFLKGI IKLFKRINER DIGKKLINYL VVGSPFMGDS  120
STPEDTFDFT RHTTNIAVEK FENGSWKVTN IITPSVLIFG PLPNILDYTA SLTLQGQQSN  180
PSFEGFGTLS ILKVAPEFLL TFSDVTSNQS SAVLGKSIFC MDPVIALMHE LTHSLHQLYG  240
INIPSDKRIR PQVSEGFFSQ DGPNVQFEEL YTFGGSDVEI IPQIERLQLR EKALGHYKDI  300
AKRLNNINKT IPSSWSSNID KYKKIFSEKY NFDKDNTGNF VVNIDKFNSL YSDLTNVMSE  360
VVYSSQYNVK NRTHYFSKHY LPVFANILDD NIYTIINGFN LTTKGFNIEN SGQNIERNPA  420
LQKLSSESVV DLFTKVCLRL TRNSRDDSTC IQVKNNTLPY VADKDSISQE IFESQIITDE  480
TNVENYSDNF SLDESILDAK VPTNPEAVDP LLPNVNMEPL NVPGEEEVFY DDITKDVDYL  540
NSYYYLEAQK LSNNVENITL TTSVEEALGY SNKIYTFLPS LAEKVNKGVQ AGLFLNWANE  600
VVEDFTTNIM KKDTLDKISD VSAIIPYIGP ALNIGNSALR GNFKQAFATA GVAFLLEGFP  660
EFTIPALGVF TFYSSIQERE KIIKTIENCL EQRVKRWKDS YQWMVSNWLS RITTRFNHIS  720
YQMYDSLSYQ ADAIKAKIDL EYKKYSGSDK ENIKSQVENL KNSLDVKISE AMNNINKFIR  780
ECSVTYLFKN MLPKVIDELN KFDLKTKTEL INLIDSHNII LVGEVDRLKA KVNESFENTI  840
PFNIFSYTNN SLLKDMINEY FNSINDSKIL SLQNKKNTLM DTSGYNAEVR VEGNVQLNPI  900
FPFDFKLGSS GDDRGKVIVT QNENIVYNAM YESFSISFWI RINKWVSNLP GYTIIDSVKN  960
NSGWSIGIIS NFLVFTLKQN ENSEQDINFS YDISKNAAGY NKWFFVTITT NMMGNMMIYI 1020
NGKLIDTIKV KELTGINFSK TITFQMNKIP NTGLITSDSD NINMWIRDFY IFAKELDDKD 1080
INILFNSLQY TNVVKDYWGN DLRYDKEYYM INVNYMNRYM SKKGNGIVFN TRKNNNDFNE 1140
GYKIIIKRIR GNTNDTRVRG ENVLYFNTTI DNKQYSLGMY KPSRNLGTDL VPLGALDQPM 1200
DEIRKYGSFI IQPCNTFDYY ASQLFLSSNA TTNRLGILSI GSYSFKLGDD YWFNHEYLIP 1260
VIKIEHYASL LESTSTHWVF VPASE                                      1285

SEQ ID NO: 9              moltype = DNA   length = 3756
FEATURE                   Location/Qualifiers
source                    1..3756
                          mol_type = other DNA
                          organism = Clostridium botulinum
SEQUENCE: 9
atgccaaaaa ttaatagttt taattataat gatcctgtta atgatagaac aattttatat   60
attaaaccag gcggttgtca agaattttat aaatcattta atattatgaa aaatatttgg  120
ataattccag agagaaatgt aattggtaca acccccaag attttcatcc gcctacttca  180
ttaaaaaatg gagatagtag ttattatgac cctaattatt tacaaagtga tgaagaaaag  240
gatagatttt taaaaatagt cacaaaaata tttaatagaa taataataa tctttcagga  300
gggatttat tagaagaact gtcaaaagct aatccatatt tagggaatga taatactcca  360
gataatcaat tccatattgg tgatgcatca gcagttgaga ttaaattctc aaatggtagc  420
caagacatac tattacctaa tgttattata atgggaacgg agcctgattt atttgaaact  480
aacagttcca atatttctct aagaaatat atatgccaa gcaatcaccg ttttggatca  540
atagcttatag taacattctc acctgaatat tcttttagat ttaatgataa ttgtatgaat  600
gaatttattc aagatcctgc tcttacatta atgcatgaat aatacattc attacatgga  660
ctatatgggg ctaaagggat tactacaag tatactataa cacaaaaaca aaatcccta   720
ataacaaata taagaggtac aaatattgaa gaattcttaa cttttggagg tactgattta   780
aacattatta ctagtgctca gtccaatgat atctatacta atcttctagc tgattataaa   840
aaaatagcgt ctaaacttag caaagtacaa gtatctaatc cactacttaa tccttataaa   900
gatgttttg aagcaaagta tggattagat aaagtgctta gcggaattta ttcggtaaat   960
ataaacaaat ttaatgatat ttttaaaaaa ttatacagct ttacggaatt tgatttacga  1020
actaaatttc aagttaaatg taggcaaact tatattggac agtataaata cttcaaactt  1080
tcaaacttgt taaatgattc tatttataat atatcagaag gctataatat aaataattta  1140
aagtaaatt ttagaggaca gaatgcaaat ttaaatccta gaattattac accaattaca  1200
ggtagaggac tagtaaaaaa aatcattaga ttttgtaaaa tatattgttc tgtaaaaggc  1260
ataaggaaat caatatgtat cgaaatataa aatggtgagt tattttttgt ggcttccgag  1320
aatagttata atgatgataa tataaatact cctaaagaaa ttgacgatac agtaacttca  1380
aataataatt atgaaaatga tttagatcag gttatttaa atttaatag tgaatcagca  1440
cctggacttt cagatgaaaa attaaattta actatccaaa atgatgctta tataccaaaa  1500
tatgattcta atgaacaag tgatatagaa caacatgatg ttaatgaact taatgtatttt  1560
ttctattag atgcacagaa agtgcccgaa ggtgaaaaata atgtcaatct cacctcttca  1620
attgatacag cattattaga acaacctaaa atatatatat ttttttcatc agaattttatt  1680
aataatgtca ataaacctgt gcaagcagca ttatttgtaa gctggataca acaagtgtta  1740
gtagattta ctactgaagc taaccaaaaa agtactgttg ataaaattgc agatattct  1800
atagttgttc catatatagg tcttgcttta aatataggaa atgaagcaca aaaaggaaat  1860
tttaaagatg cacttgaatt attaggagca ggtatttat tagaatttga acccgagctt  1920
ttaattccta caatttagt attcacgata aaatctttt taggttcatc tgataataaa  1980
aataagtta ttaaagcaat aaataatgca ttgaaagaaa gagatgaaaa atggaaagaa  2040
gtataattt ttatatatc gaattggatg actaaaatta atacacaatt taataaaaga  2100
aagaacaaa tgtatcaagc tttacaaaat caagtaaatg caattaaaac aataatagaa  2160
tctaagtata taagttatac tttagaggaa aaaaatgagc ttacaaataa atatgatatt  2220
aagcaaatag aaaatgaact taatcaaaag gtttctatag caatgaataa tatagacagg  2280
ttcttaactg aaagttctat atcctattta atgaaaataa taatgaagt aaaaattaat  2340
aaattaagag aatatgatga gaatgtcaaa acgtatttat tgaattatat tatacaacat  2400
```

-continued

```
ggatcaatct tgggagagag tcagcaagaa ctaaattcta tggtaactga taccctaaat 2460
aatagtattc cttttaagct ttcttcttat acagatgata aaatttttaat ttcatatttt 2520
aataaattct ttaagagaat taaaagtagt tcagttttaa atatgagata taaaaatgat 2580
aaatacgtag atacttcagg atatgattca aatataaata ttaatggaga tgtatataaa 2640
tatccaacta ataaaaatca atttggaata tataatgata aactagtaga agttaatata 2700
tctcaaaatg attacattat atatgataat aaatataaaa attttagtat tagtttttgg 2760
gtaagaattc ctaactatga taataagata gtaaatgtta ataatgaata cactataata 2820
aattgtatga gagataataa ttcaggatgg aaagtatctc ttaatcataa tgaaataatt 2880
tggacattcg aagataatcg aggaattaat caaaaattag catttaacta tggtaacgca 2940
aatggtatt t ctgattatat aaataagtgg atttttgtaa ctataactaa tgatagatta 3000
ggagattcta aactttatat taatggaaat ttaatagatc aaaaatcaat tttaaattta 3060
ggtaatattc atgttagtga caatatatta tttaaaatag ttaattgtag ttatacaaga 3120
tatattggta ttagatattt taatattttt gataaagaat tagatgaaac agaaattcaa 3180
actttatata gcaatgaacc taatcaaat attttgaagg attttgggg aaattatttg 3240
ctttatgaca aagaatacta tttattaaat gtgttaaaac caaataactt tattgatagg 3300
agaaagatt ctactttaag cattaataat ataagaagca ctattctttt agctaataga 3360
ttatatagtg gaataaaagt taaaatacaa agagttaata atagtagtac taacgataat 3420
cttgttagaa agaatgatca ggtatatatt aattttgtag ccagcaaaac tcacttattt 3480
ccattatatg ctgatacagc taccacaaat aaagagaaaa caataaaaat atcatcatct 3540
ggcaatagat ttaatcaagt agtagttatg aattcagtag gaaattgtac aatgaatttt 3600
aaaaataata atggaaataa tattggg tg ttaggtttca aggcagatac tgtcgttgct 3660
agtacttggt attatacaca tatgagagat catacaaaca gcaatggatg ttttttggaac 3720
tttatttctg aagaacatgg atggcaagaa aaataa 3756

SEQ ID NO: 10           moltype = AA   length = 1251
FEATURE                 Location/Qualifiers
source                  1..1251
                        mol_type = protein
                        organism = Clostridium botulinum
SEQUENCE: 10
MPKINSFNYN DPVNDRTILY IKPGGCQEFY KSFNIMKNIW IIPERNVIGT TPQDFHPPTS  60
LKNGDSSYYD PNYLQSDEEK DRFLKIVTKI FNRINNNLSG GILLEELSKA NPYLGNDNTP 120
DNQFHIGDAS AVEIKFSNGS QDILLPNVII MGAEPDLFET NSSNISLRNN YMPSNHRFGS 180
IAIVTFSPEY SFRFNDNCMN EFIQDPALTL MHELIHSLHL LYGAKGITTK YTITQKQNPL 240
ITNIRGTNIE EFLTFGGTDL NIITSAQSND IYTNLLADYK KIASKLSKVQ VSNPLLNPYK 300
DVFEAKYGLD KDASGIYSVN INKFNDIFKK LYSFTEFDLR TKFQVKCRQT YIGQYKYFKL 360
SNLLNDSIYN ISEGYNINNL KVNFRGQNAN LNPRIITPIT GRGLVKKIIR FCKNIVSVKG 420
IRKSICIEIN NGELFFVASE NSYNDDNINT PKEIDDTVTS NNNYENDLDQ VILNFNSESA 480
PGLSDEKLNL TIQNDAYIPK YDSNGTSDIE QHDVNELNVF FYLDAQKVPE GENNVNLTSS 540
IDTALLEQPK IYTFFSSEFI NNVNKPVQAA LFVSWIQQVL VDFTTEANQK STVDKIADIS 600
IVVPYIGLAL NIGNEAQKGN FKDALELLGA GILLEFEPEL LIPTILVFTI KSFLGSSDNK 660
NKVIKAINNA LKERDEKWKE VYSFIVSNWM TKINTQFNKR KEQMYQALQN QVNAIKTIIE 720
SKYNSYTLEE KNELTNKYDI KQIENELNQK VSIAMNNIDR FLTESSISYL MKIINEVKIN 780
KLREYDENVK TYLLNYIIQH GSILGESQQE LNSMVTDTLN NSIPFKLSSY TDDKILISYF 840
NKFFKRIKSS SVLNMRYKND KYVDTSGYDS NININGDVYK YPTNKNQFGI YNDKLSEVNI 900
SQNDYIIYDN KYKNFSISFW VRIPNYDNKI VNVNNEYTII NCMRDNNSGW KVSLNHNEII 960
WTFEDNRGIN QKLAFNYGNA NGISDYINKW IFVTITNDRL GDSKLYINGN LIDQKSILNL 1020
GNIHVSDNIL FKIVNCSYTR YIGIRYFNIF DKELDETEIQ TLYSNEPNTN ILKDFWGNYL 1080
LYDKEYYLLN VLKPNNFIDR RKDSTLSINN IRSTILLANR LYSGIKVKIQ RVNNSSTNDN 1140
LVRKNDQVYI NFVASKTHLF PLYADTATTN KEKTIKISSS GNRFNQVVVM NSVGNCTMNF 1200
KNNNGNNIGL LGFKADTVVA STWYYTHMRD HTNSNGCFWN FISEEHGWQE K         1251

SEQ ID NO: 11           moltype = DNA   length = 3843
FEATURE                 Location/Qualifiers
source                  1..3843
                        mol_type = other DNA
                        organism = Clostridium botulinum
SEQUENCE: 11
atgccagttg taataaatag ttttaattat aatgaccctg ttaatgatga gacaatttta  60
tacatgcaga aaccatatga agaaagaagt agaaaatatt ataaagcttt tgagattatg 120
cctaatgttt ggataatgcc tgagagagat acaataggaa ctaagcctga tgagtttcag 180
gtgccggatt cattaaagaa cggaagtagt gcttattatg atcctaatta tttaaccact 240
gatgctgaaa agatagata tttaaaaaca atgataaaat tattgaatag aattaatagt 300
aatcctacag ggaaagtttt gttagaagaa gtatcaaatg ctagaccata tttaggagat 360
gatgacacgc taattaatga attccttcca gttaatgtaa ctacaagtgt taatataaaa 420
ttttcaactg atgttgaaag ttcaataata tcgaatcttc ttgtattggg agcaggacct 480
gatatattta aagcttactg taccccctt gtaaggttta taagtcaga taaattaatt 540
gaaccaagta atcatggtt tggatcaatt aatatcttga cattttcacc tgagtatgaa 600
catatttta atgatattag tggagggaat cataatgtat cagaatcatt tattgcagat 660
cctgcaattt cactagctca tgaattgata catgcactac atggattata cggggctaag 720
gcagttactc ataaagagtc tctagtagca gagcgaggac ctcttatgat agccgaaaag 780
cccataaggc tagaagaatt tttaacttt ggaggtgagg atttaaatat cattcctagt 840
gctatgaagg aaaaaaatata taacgatctt ttagctaact atgaaaaat agctactaga 900
cttagagaag ttaatacggc tcctcctgga tatatatta tgaagattt 960
caatggaagt atggactaga tagaaatgca gatggaagtt atactgtgaa tagaaataaa 1020
tttaatgaaa tttataaaaa attatatagc tttacagaga tgacttagc aaataaattt 1080
aaagtaaaat gtaaaatac ttatttttatt aaatatggat ttgtaaaagt tccaaatttg 1140
ttagatgatg atatttatac tgtatcagag gggtttaata taggtaattt agcagtaaac 1200
aatcgcggac aaaatataaa tttaaatcct aaaattattg attccattcc agataaaggt 1260
```

```
ttagtggaaa agattattaa attttgtaag agcattattc ctagaaaagg tacgaagcag   1320
tcaccgtcac tatgcattag agtaaataat agggagttat tttttgtagc ttcagaaagt   1380
agctataatg aaagtgatat taatacacct aaagaaattg acgatacaac aaatctaaat   1440
aataattata gaaataattt agatgaagtt attttagatt ataatagtga gacaatacct   1500
caaatatcaa atcgaacatt aaatacactt gtacaagaca atagttatgt gccaagatat   1560
gattctaatg gaacaagtga aatagaggaa tatgatgttg ttgactttaa tgtattttc   1620
tatttacatg cacaaaaagt accagaaggt gaaaccaata taagtttaac ttcttcaatt   1680
gatacagcat tattagaaga atccaaagta tatacatttt tttcttcaga gtttatcgat   1740
actatcaata aacctgtaaa tgcagcacta tttatagatt ggataagcaa agtaataaga   1800
gattttacca ctgaagctac acaaaaaagt actgttgata agattgcaga catatcttta   1860
attgtaccct atgtaggtct tgctttgaat atagttattg aggcagaaaa aggaaatttt   1920
gaggaggcat ttgaattatt aggagcgggt attttattag aatttgtgcc agagcttaca   1980
attcctgtaa ttttagtgtt tacgataaaa tcctatatag attcatatg gaataaaat    2040
aaagcaatta aagcaataaa taattcatta atcgaaagag aagcaaagtg gaaagaaata   2100
tatagttgga tagtatcaaa ttggcttact agaattaata cgcaatttaa taaaagaaaa   2160
gagcaaatgt atcaggcttt acaaaatcaa gtagatgcaa taaaaacagc aatagaatat   2220
aaatataata attatacttc agatgagaaa aatagacttg aatctaaata taatatcaat   2280
aatatagaag aagaattgaa taaaaaagtt tctttagcaa tgaaaaatat agaaagattt   2340
atgcacagaaa gttctatatc ttatttaatg aaattaataa atgaagccga agttggtaaa   2400
ttaaaagaat atgataaaca tgttaagagc gatttattag actatattct ctaccataaa   2460
ttaatcttag gagagcagac aaaggaatta attgatttgg tgactagtac tttgaatagt   2520
agtattccat ttgaactttc ttcatatact aatgataaat ttctaattat atattttaat   2580
agattatata aaaaaattaa agatagttct attttagata tgcgatatga aaataataaa   2640
tttatagata tctctggata tggttcaaat ataagcatta atggaaacgt atatatttat   2700
tcaacaaata gaaatcaatt tggaatatat agtggtaggc ttagtgaagt taatatagct   2760
caaaataatg atatatttat caatagtaga tatcaaaatt ttagtattag tttctgggta   2820
accattccta aacactacag acctatgaat cgtaatcggg aatacactat aataaattgt   2880
atggggaata taattcgggg atggaaaata tcacttagaa ctattagaga ttgtgaaata   2940
atttggactt tacaagatac ttccggaaat aaggaaaaat taatttttag gtatgaagaa   3000
cttgctagta tatctgatta tataaataaa tggattttgt taactattac taataagaa   3060
ttaggcaatt ctagaattta catcaatgga aatttaatag ttgaaaaatc aatttcgaat   3120
ttaggtgata ttcatgttag tgataatata ttatttaaaa ttgttggttg tgatgatgaa   3180
acgtatgttg gtataagata ttttaaagtt tttaatacgg aattagataa aacagaaatt   3240
gagactttat atagtaatga gccagatcca agtatcttaa aagctattg gggaaattat   3300
ttgctatata ataaaaaata ttatttattc aatttactaa gaaaagataa gtatattact   3360
cggaattcag gcattttaaa tattaatcaa caaagaggtg ttactggagg catatctgtt   3420
tttttgaact ataaattata tgaaggagta gaagttatta taagaaaaaa tgctcctata   3480
gatatatcta atacagatat ttttgttaga aaaaacgatc tagcatacat taatgtagta   3540
gatcatggtg tagaatatcg gttatatgct gatatatcaa ttacaaaatc agagaaaata   3600
ataaaattaa taagaacatc taatccaaac gatagcttag gtcaaattat agttatggat   3660
tcaataggaa ataattgcac aatgaatttt caaaacaatg atgggagcaa tataggatta   3720
ctaggttttc attcagatga tttggttgct agtagttggt attataacca tatacgaaga   3780
aacactagca gtaatggatg cttttggagt tttatttcta aagagcatgg ttggaaagaa   3840
taa                                                                3843

SEQ ID NO: 12              moltype = AA  length = 1280
FEATURE                    Location/Qualifiers
source                     1..1280
                           mol_type = protein
                           organism = Clostridium botulinum
SEQUENCE: 12
MPVVINSFNY NDPVNDETIL YMQKPYEERS RKYYKAFEIM PNVWIMPERD TIGTKPDEFQ    60
VPDSLKNGSS AYYDPNYLTT DAEKDRYLKT MIKLFNRINS NPTGKVLLEE VSNARPYLGD   120
DDTLINEFLP VNVTTSVNIK FSTDVESSII SNLLVLGAGP DIFKAYCTPL VRFNKSDKLI   180
EPSNHGFGSI NILTFSPEYE HIFNDISGGN HNSTESFIAD PAISLAHELI HALHGLYGAK   240
AVTHKESLVA ERGPLMIAEK PIRLEEFLTP GGEDLNIIPS AMKEKIYNDL LANYEKIATR   300
LREVNTAPPG YDINEYKDYF QWKYGLDRNA DGSYTVNRNK FNEIYKKLYS FTEIDLANKF   360
KVKCRNTYFI KYGFVKVPNL LDDDIYTVSE GFNIGNLAVN NRGQNINLNP KIIDSIPDKG   420
LVEKIIKFCK SIIPRKGTKQ SPSLCIRVNN RELFFVASES SYNESDINTP KEIDDTTNLN   480
NNYRNNLDEV ILDYNSETIP QISNRTLNTL VQDNSYVPRY DSNGTSEIEE YDVVDFNVFF   540
YLHAQKVPEG ETNISLTSSI DTALLEESKV YTFFSSEFID TINKPVNAAL FIDWISKVIR   600
DFTTEATQKS TVDKIADISL IVPYVGLALN IVIEAEKGNF EEAFELLGAG ILLEFVPELT   660
IPVILVFTIK SYIDSYENKN KAIKAINNSL IEREAKWKEI YSWIVSNWLT RINTQFNKRK   720
EQMYQALQNQ VDAIKTAIEY KYNNYTSDEK NRLESKYNIN NIEEELNKKV SLAMKNIERF   780
MTESSISYLM KLINEAEVGK LKEYDKHVKS DLLDYILYHK LILGEQTKEL IDLVTSTLNS   840
SIPFELSSYT NDKILIIYFN RLYKKIKDSS ILDMRYENNK FIDISGYGSN ISINGNVYIY   900
STNRNQFGIY SGRLSEVNIA QNNDIIYNSR YQNFSISFWV TIPKHYRPMN RNREYTIINC   960
MGNNNSGWKI SLRTIRDCEI IWTLQDTSGN KEKLIFRYEE LASISDYINK WIFVTITNNR  1020
LGNSRIYING NLIVEKSISN LGDIHVSDNI LFKIVGCDDE TYVGIRYFKV FNTELDKTEI  1080
ETLYSNEPDP SILKDYWGNY LLYNKKYYLF NLLRKDKYIT RNSGILNINQ QRGVTGGISV  1140
FLNYKLYEGV EVIIRKNAPI DISNTDNFVR KNDLAYINVV DHGVEYRLYA DISITKSEKI  1200
IKLIRTSNPN DSLGQIIVMD SIGNNCTMNF QNNDGSNIGL LGFHSDDLVA SSWYYNHIRR  1260
NTSSNGCFWS FISKEHGWKE                                             1280

SEQ ID NO: 13              moltype = DNA  length = 3894
FEATURE                    Location/Qualifiers
variation                  20
                           replace = n
source                     1..3894
```

```
                    mol_type = other DNA
                    organism = Clostridium botulinum
SEQUENCE: 13
atgccagtta atataaaaan ctttaattat aatgacccta ttaataatga tgacattatt    60
atgatggaac cattcaatga cccagggcca ggaacatatt ataaagcttt taggattata   120
gatcgtattt ggatagtacc agaaaggttt acttatggat ttcaacctga ccaatttaat   180
gccagtacag gagttttag taaagatgtc tacgaatatt acgatccaac ttatttaaaa   240
accgatgctg aaaaagataa attttaaaa acaatgatta aattatttaa tagaattaat   300
tcaaaaccat caggacagag attactggat atgatagtag atgctatacc ttatcttgga   360
aatgcatcta caccgcccga caaatttgca gcaaatgttg caaatgtatc tattaataaa   420
aaaattatcc aacctggagc tgaagatcaa ataaaggtt taatgacaaa tttaataata   480
tttggaccag gaccagttct aagtgataat tttactgata gtatgattat gaatggccat   540
tccccaatat cagaaggatt tggtgcaaga atgatgataa gattttgtcc tagttgttta   600
aatgtattta ataatgttca ggaaaataaa gatacatcta tatttagtag acgcgcgtat   660
tttgcagatc cagctctaac gttaatgcat gaacttatac atgtgttaca tggattatat   720
ggaattaaga taagtaattt accaattact ccaaatacaa aagaattttt catgcaacat   780
agcgatcctg tacaagcaga agaactatat acattcggag gacatgatcc tagtgttata   840
agtccttcta cggatatgaa tatttataat aaagcgttac aaaattttca agatatagct   900
aataggctta atattgtttc aagtgcccaa gggagtggaa ttgatatttc cttatataaa   960
caaatatata aaaataaata tgatttgtt gaagatccta atggaaaata tagtgtagat  1020
aaggataagt tgataaaatt ataaggcc ttaatgtttg gctttactga aactaatcta  1080
gctggtgaat atggaataaa aactaggtat tcttatttta aaatattt gccaccgata  1140
aaaactgaaa aattgttaga caatacaatt tatactcaaa atgaaggctt aacatagct  1200
agtaaaaatc tcaaaacgga atttaatggt cagaataagg cggtaaataa agaggcttat  1260
gaagaaatca gcctagaaca tctcgttata tatagaatag caatgtgcaa gcctgtaatg  1320
tacaaaaata ccggtaaatc tgaacagtgt attattgtta ataatgagga tttattttc  1380
atagctaata aagatagttt ttcaaaagat ttagctaaag cagaaactat agcatataat  1440
acacaaata atactataga aaataatttt tctatagatc agttgatttt agataatgat  1500
ttaagcagtg gcatagactt accaaatgaa aacacagaac catttacaaa ttttgacgac  1560
atagatatcc ctgtgtatat taaacaatct gcttaaaaa aaattttgt ggatggagat  1620
agccttttg aatattttaca tgctcaaaca tttccttcta atatagaaaa tctacaacta  1680
acgaattcat taaatgatgc tttaagaaat aataataaag tctatacttt tttttctaca  1740
aaccttgttg aaaaagctaa tacagttgta ggtgcttcac tttttgtaaa ctgggtaaaa  1800
ggagtaatag atgattttac atctgaatcc acacaaaaaa actataga taaagtttca  1860
gatgtatcca taattattcc ctatatagga cctgctttga atgtaggaaa tgaaacagtc  1920
aaagaaaatt ttaaaaatgc ttttgaaata ggtggagccg ctatcttaat ggagtttatt  1980
ccagaactta ttgtacctat agttggattt tttacattag aatcatatgt aggaaaataa  2040
gggcatatta ttatgacgat atccaatgct taaagaaaa gggatcaaaa atggacagat  2100
atgtatggtt tgatagtatc gcagtggctc tcaacggtta ctccatt ttatacaata  2160
aaagaaagaa tgtacaatgc tttaaataat caatcacaag caatagaaaa aataataga  2220
gatcaatata atagatatag tgaagaagat aaaatgaata ttaacattga ttttaatgat  2280
atagatttta aacttaatca aagtataaat ttagcaataa acaatataga tgattttata  2340
aaccaatgtt ctatatcata tctaatgaat agaatgattc cattagctgt aaaaaagtta  2400
aaagactttg atgataatct taagagagat ttattggagt atatagatac aaatgaacta  2460
tatttacttg atgaagtaaa tattctaaaa tcaaaagtaa atagacacct aaaagacagt  2520
ataccatttg atctttcact atataccaag gacacaattt taatacaagt ttttaataat  2580
tatattagta atattagtag taatgctatt ttaagtttaa gttatagagg tgggcgttta  2640
atagattcat ctggatatgg tgcaactatg aatgtaggtt cagatgttat ctttaatgat  2700
ataggaaatg gtcaatttaa attaaataat tctgaaaaata gtaatattac ggcacatcaa  2760
agtaaattcg ttgtatatga tagtatgttt gataatttta gcattaactt tgggtaagg  2820
actcctaaat ataataataa tgatatacaa acttatcttc aaaatgagta tacaataatt  2880
agttgtataa aaaatgactc aggatgaaaa gtatctatta agggaaaatag aataatatgg  2940
acattaatag atgttaatgc aaaatctaaa tcaatatttt tcgaatatag tataaaaagat  3000
aatatatcag attatataaa taatggtttt tccataacta ttactaatga tagattaggt  3060
aacgcaaata tttataataaa tggaagtttg aaaaaaagtg aaaaaattt aaacttagat  3120
agaattaatt ctagtaatga tatagacttc aaattaatta attgtacaga tactactaaa  3180
tttgtttgga ttaaggattt taatattttt ggtagagaat aaatgctac agaagtatct  3240
tcactatatt ggattcaatc atctacaaat actttaaaag attttggggg gaatccttta  3300
agatacgata cacaatacta tctgtttaat caaggtatgc aaaatatcta tataaagtat  3360
tttagtaaag cttctatggg ggaaactgca ccacgtacaa actttaataa tgcagcaata  3420
aattatcaaa attatatct tggtttacga tttattataa aaaaagcatc aaattctcgg  3480
aatataaata atgataatat agtcagagaa ggagattata tatatcttaa tattgataat  3540
atttctgatg aatcttacag agtatatgtt ttggtgaatt ctaaagaaat tcaaactcaa  3600
ttatttttag cacccataaa tgatgatcct acgttctgta gtactaca aataaaaaaa  3660
tattatgaaa aaacaacata taattgtcag atactttgcg aaaaagatac taaaacatttt  3720
gggctgtttg gaattggtaa atttgttaaa gattatggat atgtttggga tacctatgat  3780
aattattttt gcataagtca gtggtatctc agaagaatat ctgaaaatat aaataaatta  3840
aggttgggat gtaattggca attcattccc gtggatgaag gatggacaga ataa         3894

SEQ ID NO: 14          moltype = AA   length = 1297
FEATURE                Location/Qualifiers
UNSURE                 7
                       note = Xaa can be any naturally occurring amino acid
source                 1..1297
                       mol_type = protein
                       organism = Clostridium botulinum
SEQUENCE: 14
MPVNIKXFNY NDPINNDDII MMEPFNDPGP GTYYKAFRII DRIWIVPERF TYGFQPDQFN    60
ASTGVFSKDV YEYYDPTYLK TDAEKDKFLK TMIKLFNRIN SKPSGQRLLD MIVDAIPYLG   120
```

```
NASTPPDKFA ANVANVSINK KIIQPGAEDQ IKGLMTNLII FGPGPVLSDN FTDSMIMNGH  180
SPISEGFGAR MMIRFCPSCL NVFNNVQENK DTSIFSRRAY FADPALTLMH ELIHVLHGLY  240
GIKISNLPIT PNTKEFFMQH SDPVQAEELY TFGGHDPSVI SPSTDMNIYN KALQNFQDIA  300
NRLNIVSSAQ GSGIDISLYK QIYKNKYDFV EDPNGKYSVD KDKFDKLYKA LMFGFTETNL  360
AGEYGIKTRY SYFSEYLPPI KTEKLLDNTI YTQNEGFNIA SKNLKTEFNG QNKAVNKEAY  420
EEISLEHLVI YRIAMCKPVM YKNTGKSEQC IIVNNEDLFF IANKDSFSKD LAKAETIAYN  480
TQNNTIENNF SIDQLILDND LSSGIDLPNE NTEPFTNFDD IDIPVYIKQS ALKKIFVDGD  540
SLFEYLHAQT FPSNIENLQL TNSLNDALRN NNKVYTFFST NLVEKANTVV GASLFVNWVK  600
GVIDDFTSES TQKSTIDKVS DVSIIIPYIG PALNVGNETA KENFKNAFEI GGAAILMEFI  660
PELIVPIVGF FTLESYVGNK GHIIMTISNA LKKRDQKWTD MYGLIVSQWL STVNTQFYTI  720
KERMYNALNN QSQAIEKIIE DQYNRYSEED KMNINIDFND IDFKLNQSIN LAINNIDDFI  780
NQCSISYLMN RMIPLAVKKL KDFDDNLKRD LLEYIDTNEL YLLDEVNILK SKVNRHLKDS  840
IPFDLSLYTK DTILIQVFNN YISNISSNAI LSLSYRGGRL IDSSGYGATM NVGSDVIFND  900
IGNGQFKLNN SENSNITAHQ SKFVVYDSMF DNFSINFWVR TPKYNNNDIQ TYLQNEYTII  960
SCIKNDSGWK VSIKGNRIIW TLIDVNAKSK SIFFEYSIKD NISDYINKWF SITITNDRLG  1020
NANIYINGSL KKSEKILNLD RINSSNDIDF KLINCTDTTK FVWIKDFNIF GRELNATEVS  1080
SLYWIQSSTN TLKDFWGNPL RYDTQYYLFN QGMQNIYIKY FSKASMGETA PRTNFNNAAI  1140
NYQNLYLGLR FIIKKASNSR NINNDNIVRE GDYIYLNIDN ISDESYRVYV LVNSKEIQTQ  1200
LFLAPINDDP TFYDVLQIKK YYEKTTYNCQ ILCEKDTKTF GLFGIGKFVK DYGYVWDTYD  1260
NYFCISQWYL RRISENINKL RLGCNWQFIP VDEGWTE                          1297
```

USE OF BOTULINUM NEUROTOXIN IN THE TREATMENT OF SIALORRHEA

CROSS-REFERENCE TO RELATED APPLICATIONS

This patent application is a continuation of U.S. patent application Ser. No. 16/893,799, filed Jun. 5, 2020, which is a continuation of U.S. patent application Ser. No. 16/129,311, filed Sep. 12, 2018, now U.S. Pat. No. 10,709,772, issued 14 Jul. 2020, which is a continuation of International Patent Application No. PCT/EP2018/056850, filed Mar. 19, 2018, which claims priority to European Patent Application No. 17162719.3, filed Mar. 24, 2017.

REFERENCE TO SEQUENCE LISTING SUBMITTED AS A COMPLIANT ASCII TEXT FILE (.txt)

Pursuant to the EFS-Web legal framework and 37 CFR §§ 1.821-825 (see MPEP § 2442.03(a)), a Sequence Listing in the form of an ASCII-compliant text file (entitled "3000034-005002_Sequence_Listing_ST26.xml" created on May 24, 2023, and 49,973 bytes in size) is submitted concurrently with the instant application, and the entire contents of the Sequence Listing are incorporated by reference.

BACKGROUND

This invention relates to improved uses of botulinum neurotoxins in the treatment of a disease or condition associated with sialorrhea or increased saliva production. In particular are botulinum neurotoxins disclosed which are administered into parotid and submandibular glands in a dose ratio between 1.45 to 1 and 1.7 to 1.

BACKGROUND OF THE INVENTION

Drooling is generally represented by a wide variety of clinical conditions which result in the symptom of saliva overflowing the lip margin (known as anterior drooling) or inadvertently overflowing the pharynx, involuntarily entering the glottis and the trachea (known as posterior drooling). As anterior drooling is mainly a problem for patients with regard to social interaction, posterior drooling can also cause cough and irritation in subjects with intact cough reflex or aspired silently in unconscious subjects.

The term drooling is often used in lay language for the medical term sialorrhea, hypersalivation or ptyalism depending on clinical condition, country of usage, specialty of medicine. Per definition, sialorrhea is the "excess spillage of saliva over the lip margin", hypersalivation is the "excessive production of saliva", ptyalism is the "hypersalivation in pregnant women". Those terms and definitions are not consistently used with respect to their unclear cause, and pathomechanism of the underlying conditions and problems.

Causes of sialorrhea can be various and generally relate to an overproduction of saliva or underperformance of saliva managing or eliminating anatomical structures or physiological functions. Of course the combination of those factors makes a clear distinction of causes impossible, therefore the descriptors like diagnoses of the symptoms as listed above are used contradictory. In some cases only anatomical malformations and deformities of salivary glands and ducts, lips, oral cavity, and teeth (defects in lip closure, dental malocclusion) causes local bypasses between the oral cavity and the external world enabling the uncontrolled outflow of the produced saliva.

Malformations, strictures, scars, fistulas and bypasses can occur as permanent consequences of oral or head and neck cancer, injuries and as complications of their surgery. Patients with intellectual disabilities may have permanently open mouth, causing the same effect with or without malformations. Reduced sensorimotor abilities, inefficient oral neuromuscular control, reduced protective reflexes, hypomotility of swallowing muscles, decreased swallowing frequency or ineffective swallowing or dysphagia appear to be the most frequent causes of inherent sialorrhea in patients with neurological conditions selected for example from Parkinson's disease, Progressive Supranuclear Palsy, Corticobasal Degeneration, Multiple System Atrophy, Amyotrophic lateral sclerosis (ALS), cerebral palsy, stroke, traumatic brain injury (TBI), clozapine induced hypersalivation, Rett syndrome, Angelman syndrome, epileptic encephalopathy and brain tumours, total pharyngolaryngectomy, supracricoid laryngectomy and supraglottic laryngectomy, dementia, or intellectual disability or any other cause of sialorrhea or hypersalivation. If not frequently swallowed down due to disturbed movement control of swallowing, the produced unstimulated or stimulated saliva is pooled in the oral cavity. Uncontrolled opening of mouth and anterograde posture of the head facilitates the overflowing of the pooled saliva over the lip margin of the patient.

Salivation can also be increased permanently by irritating factors e.g. massive caries or odontolith, hypertrophy of salivary glands, gastroesophageal reflux or by drugs or toxins inducing hypersalivation as a side effect (e.g. Clozapine, Benzodiazepines, Antipsychotics), causing permanent activation of salivary nuclei or nerve endings in the salivary glands.

Overproduction of saliva can only be controlled in otherwise healthy individuals to a certain extent. In patients with disabled saliva management the upper threshold of the ability to control pooled saliva in the mouth or to swallow the overproduced amount of saliva are lower, therefore more challenging.

Treatment options for swallowing problems focus on rehabilitative measures (swallowing training, oral motor control training) however the unconscious mechanisms of frequent swallowing can hardly be trained and developed in patients with progressive neurological diseases such as Parkinson's disease or ALS. Therefore treatment of sialorrhea is often focused on the reduction of saliva production. Earliest approaches used well-known anticholinergic drugs (e.g. Atropine, Ipratropium Bromide, Scopolamine, Glycopyrrolate, Tropicamide), acting inhibitory on muscarinic cholinergic nerves, which control the amount of produced saliva by salivary glands in and around the oral cavity. Several other derivatives of anticholinergics were also tested and used off label in this indication. Only Glycopyrrolate is approved for the treatment of drooling in children in the USA and EU recently.

Another treatment alternative is botulinum toxin, which is administered to patients by intramuscular injections to reduce muscle tonus and spasticity in treated muscles, or hyperhidrosis. Dry mouth was detected as adverse drug reaction in such patients and this motivated physicians to treat salivary glands with Botulinum toxin A or B directly i.e. by intraglandular or intraparenchymal injections of Botulinum toxin A or B into the major salivary glands parotids and submandibular glands.

*Clostridium* is a genus of anaerobe gram-positive bacteria, belonging to the Firmicutes. *Clostridium* consists of around 100 species that include common free-living bacteria as well as important pathogens, such as *Clostridium botulinum* and *Clostridium tetani*. Both species produce neurotoxins, botulinum toxin and tetanus toxin, respectively. These neurotoxins are potent inhibitors of calcium-dependent neurotransmitter secretion of neuronal cells and are among the strongest toxins known to man. The lethal dose in humans lies between 0.1 ng and 1 ng per kilogram of body weight.

Oral ingestion of botulinum toxin via contaminated food or generation of botulinum toxin in wounds can cause botulism, which is characterised by paralysis of various muscles. Paralysis of the breathing muscles can cause death of the affected individual.

Although both botulinum neurotoxin (BoNT) and tetanus neurotoxin (TeNT) function via a similar initial physiological mechanism of action, inhibiting neurotransmitter release from the axon of the affected neuron into the synapse, they differ in their clinical response. While the botulinum neurotoxin acts at the neuromuscular junction and other cholinergic synapses in the peripheral nervous system, inhibiting the release of the neurotransmitter acetylcholine and thereby causing flaccid paralysis, the tetanus neurotoxin, which is transcytosed into central neurons, acts mainly in the central nervous system, preventing the release of the inhibitory neurotransmitters GABA (gamma-am inobutyric acid) and glycine by degrading the protein synaptobrevin. The consequent overactivity of spinal cord motor neurons causes generalized contractions of the agonist and antagonist musculature, termed a tetanic spasm (rigid paralysis).

While the tetanus neurotoxin exists in one immunologically distinct type, the botulinum neurotoxins are known to occur in seven different immunogenic serotypes, termed BoNT/A through BoNT/H with further subtypes. Most *Clostridium botulinum* strains produce one type of neurotoxin, but strains producing multiple neurotoxins have also been described.

Botulinum and tetanus neurotoxins have highly homologous amino acid sequences and show a similar domain structure. Their biologically active form comprises two peptide chains, a light chain of about 50 kDa and a heavy chain of about 100 kDa, linked by a disulfide bond. A linker or loop region, whose length varies among different clostridial neurotoxins, is located between the two cysteine residues forming the disulfide bond. This loop region is proteolytically cleaved by an unknown clostridial endoprotease to obtain the biologically active neurotoxin.

The molecular mechanism of intoxication by TeNT and BoNT appears to be similar as well: entry into the target neuron is mediated by binding of the C-terminal part of the heavy chain to a specific cell surface receptor; the neurotoxin is then taken up by receptor-mediated endocytosis. The low pH in the so formed endosome then triggers a conformational change in the clostridial neurotoxin which allows it to embed itself in the endosomal membrane and to translocate through the endosomal membrane into the cytoplasm, where the disulfide bond joining the heavy and the light chain is reduced. The light chain can then selectively cleave so called SNARE-proteins, which are essential for different steps of neurotransmitter release into the synaptic cleft, e.g. recognition, docking and fusion of neurotransmitter-containing vesicles with the plasma membrane. TeNT, BoNT/B, BoNT/D, BoNT/F, and BoNT/G cause proteolytic cleavage of synaptobrevin or VAMP (vesicle-associated membrane protein), BoNT/A and BoNT/E cleave the plasma membrane-associated protein SNAP-25, and BoNT/C1 cleaves the integral plasma membrane protein syntaxin and SNAP-25.

In *Clostridium botulinum*, the botulinum neurotoxin is formed as a protein complex comprising the neurotoxic component and non-toxic proteins. The accessory proteins embed the neurotoxic component thereby protecting it from degradation by digestive enzymes in the gastrointestinal tract without adding anything to the toxic effect. Thus, botulinum neurotoxins of most serotypes are orally toxic. Complexes with, for example, 450 kDa or with 900 kDa are obtainable from cultures of *Clostridium botulinum*.

In recent years, botulinum neurotoxins have been used as therapeutic agents, for example in the treatment of dystonias and spasms, and have additionally been used in cosmetic applications, such as the treatment of fine wrinkles. Preparations comprising botulinum neurotoxin complexes are commercially available, e.g. from Ipsen Ltd (Dysport®), Solstice Neurosciences LLC/US Worldmeds LLC (Myobloc®) or Allergan Inc. (Botox®). A high purity neurotoxic component of botulinum neurotoxin, free of any complexing proteins, is for example available from Merz Pharmaceuticals GmbH, Frankfurt (Xeomin®, Bocouture®).

There are a couple of reports in the prior art about the use of botulinum neurotoxin A and B in patients with sialorrhea caused by different underlying diseases. For example, Breheret et al. (Annales francaises d Óto-rhino-laryngologie et de Pathologie Cervico-faciale, volume 128, Issue 5, 2011, pages 266-271), Barbero et al. (J Neurol. 2015 December; 262(12):2662-7), Suskind et al. (Laryngoscope. 2002 January; 112(1):73-81), Porta et al. (J Neurol Neurosurg Psychiatry. 2001 April; 70(4):538-40.), Narayanaswami et al. (Parkinsonism Relat Disord. 2016 September; 30:73-7) and Castelnovo et al. (Movement Disorders 2013, Volume 28, Abstract Supplement) report the use of different toxins according to several different protocols with varying amounts of toxin administered to the salivary glands for treating sialorrhea in a variety of medical conditions. Despite the number of studies providing data about safety and efficacy of using botulinum neurotoxins in sialorrhea, there are still a lot of ongoing discussions without clear recommendations about the dosages, the sites of administration and the type of toxin to be used.

BRIEF SUMMARY

One of the objects of the present invention is to provide a botulinum neurotoxin for treatment of a disease or condition associated with sialorrhea or increased saliva production which limits the activity of the salivary glands for a long period of time with an extent that the subject shows no drooling but which still allows that the reduced amount of produced saliva is sufficient for normal physiologic functioning, e.g. as lubricant, as ion reservoir, as buffer, as cleansing, for antimicrobial actions, for agglutination, for pellicle formation, for digestion, for taste, for excretion and/or for water balance. Another object of the present invention is to avoid side effects related to the treatment with a botulinum neurotoxin or to reduce them at least in frequency, severity and/or duration while under treatment. As a further object of the present invention, the botulinum neurotoxins should provide advantageous treatment results over a long period of treatment as the underlying disease will not be affected by the treatment, therefore long lasting therapy should be applicable effective and safe without waning of efficacy or compromising safety with repeated injection cycles for prolonged treatment.

Surprisingly, it has been identified that a botulinum neurotoxin can address one or more of these objections, if it is used in treating a disease or condition associated with sialorrhea or increased saliva production, wherein said botulinum neurotoxin is administered by injection into parotid glands and submandibular glands and wherein the ratio between the doses of botulinum neurotoxin administered to each of the parotid glands and each of the submandibular glands is between 1.45 to 1 and 1.7 to 1.

BRIEF DESCRIPTION OF THE SEVERAL VIEWS OF THE DRAWINGS

FIG. 1 shows mean reduction in objectively measured unstimulated salivary flow rate (uSFR) from baseline (FAS).

FIG. 2 shows mean global impression of change scale (GICS) (FAS). Superiority of NT 201 over placebo is shown by mean Global Impression of Change Scale (GICS) [FAS].

FIG. 3 shows response rate in subject's GICS over time (FAS).

FIG. 4 shows mean reduction of drooling severity and frequency sum score (DSFS) from baseline (FAS). Superiority of NT 201 over placebo is shown by the mean reduction of drooling severity and frequency sum score (DSFS) from baseline [FAS].

FIG. 5 shows mean mROMP drooling subscore reduction from baseline (FAS).

DETAILED DESCRIPTION OF THE INVENTION

The present invention may be understood more readily by reference to the following detailed description of the invention and the examples included therein.

In a first embodiment the present invention relates to a botulinum neurotoxin for use in treating a disease or condition associated with sialorrhea or increased saliva production, wherein said botulinum neurotoxin is administered by injection into parotid glands and submandibular glands and wherein the ratio between the doses of botulinum neurotoxin administered to each of the parotid glands and each of the submandibular glands is between 1.45 to 1 and 1.7 to 1. In a preferred embodiment the botulinum neurotoxin of the present invention is administered into parotid glands and submandibular glands wherein the ratio between the doses of botulinum neurotoxin administered to each of the parotid glands and each of the submandibular glands is between 1.50 to 1 and 1.6 to 1. In a particular preferred embodiment the botulinum neurotoxin of the present invention is administered into parotid glands and submandibular glands wherein the ratio between the doses of botulinum neurotoxin administered to each of the parotid glands and each of the submandibular glands is 1.50 to 1.

In a further embodiment the present invention relates to a method of treating a disease or condition associated with sialorrhea or increased saliva production in a patient, the method comprising administering a therapeutically effective amount of a botulinum neurotoxin by injection into parotid glands and submandibular glands, wherein the ratio between the doses of botulinum neurotoxin administered to each of the parotid glands and each of the submandibular glands is between 1.45 to 1 and 1.7 to 1. In a preferred embodiment the method of the present invention comprises administering a therapeutically effective amount of a botulinum neurotoxin by injection into parotid glands and submandibular glands, wherein the ratio between the doses of botulinum neurotoxin administered to each of the parotid glands and each of the submandibular glands is between 1.50 to 1 and 1.6 to 1. In a particular preferred embodiment the method of the present invention comprises administering a therapeutically effective amount of a botulinum neurotoxin by injection into parotid glands and submandibular glands, wherein the ratio between the doses of botulinum neurotoxin administered to each of the parotid glands and each of the submandibular glands is 1.50 to 1.

In a further aspect the present invention generally relates to botulinum toxins, for treating a disease or condition associated with sialorrhea or increased saliva production. In particular embodiments of the present invention the disease or condition associated with sialorrhea or increased saliva production is associated for example with Parkinson's disease, Progressive Supranuclear Palsy, Corticobasal Degeneration, Multiple System Atrophy, Amyotrophic lateral sclerosis (ALS), cerebral palsy, stroke, traumatic brain injury (TBI), clozapine induced hypersalivation, Rett syndrome, Angelman syndrome, epileptic encephalopathy, brain tumours, total pharyngolaryngectomy, supracricoid laryngectomy and supraglottic laryngectomy, dementia, or intellectual disability (e.g. global developmental delay, severe learning disability) or any other cause of sialorrhea or hypersalivation. A disease or condition associated with sialorrhea or increased saliva production according to the present invention can be also Down's syndrome, Smith-Lemli-Opitz syndrome, Möbius syndrome, MEGDEL syndrome, Beckwith-Wiedemann syndrome, lymphatic malformation of the tongue, Foix-Chavany-Marie syndrome, chromosomal abnormalities and genetic diseases like 17q21 deletion, familial dysautonomia, partial trisomy 22, Aicardi syndrome, SMA Type 1, GM1 gangliosidosis or Apert syndrome, Wilson disease, congenital brain malformation like hydrocephalus, microcephaly, pontocerebellar hypoplasia, posterior fossa mass, neuronal ceroid lipofuscinosis, Batten disease, metachromatic leukodystrophy, multiplex arthrogryposis, encephalopathy, lissencephaly or pachigyria, brain injuries like spinal cord injury, hypoxic ischemic encephalopathy, congenital toxoplasmosis, congenital CMV infection, post meningoencephalitis or post herpes encephalitis, neuromotor disorders like oral dyspraxia, suprabulbar palsy, operculum syndrome, myopathy, infantile spasms, myotonic dystrophy, Duchenne muscular dystrophy, Neurofibromatosis type I or mitochondriopathy, fetal alcohol syndrome, autism or juvenile Guillain-Barré Syndrome.

In particular embodiments of the present invention the disease or condition associated with sialorrhea or increased saliva production is associated with stroke, in particular the disease or condition associated with sialorrhea or increased saliva production occurred after stroke (post stroke).

In preferred embodiments of the present invention the disease or condition associated with sialorrhea or increased saliva production is associated for example with traumatic brain injury (TBI), post stroke, Parkinson's disease or atypical parkinsonism (Progressive Supranuclear Palsy [PSP], Multisystem Atrophy [MSA], Corticobasal Degeneration [CBD]). In another preferred embodiment of the present invention the disease or condition associated with sialorrhea or increased saliva production is traumatic brain injury (TBI), post stoke, Parkinson's disease or atypical parkinsonism (Progressive Supranuclear Palsy [PSP], Multisystem Atrophy [MSA], Corticobasal Degeneration [CBD]) with chronic sialorrhea for at least 3 months duration and sialorrhea severity of at least 2 score points on the Drooling Severity Subscale and a frequency of at least 2 score points on the Drooling Frequency Subscale and at least 6 score points on the sum score Drooling Severity and Frequency Scale. In another preferred embodiment of the present invention the disease or condition associated with sialorrhea or increased saliva production is traumatic brain injury (TBI), post stoke, Parkinson's disease or atypical parkinsonism (Progressive Supranuclear Palsy PSP, Multisystem Atrophy MSA, Corticobasal Degeneration CBD) with chronic sialorrhea having at least 0.3 g/min unstimulated salivary flow rate.

The present invention relates in a further embodiment to a pharmaceutical composition comprising a botulinum neurotoxin for the use in treating a disease or condition associated with sialorrhea or increased saliva production, and a pharmaceutical acceptable carrier, wherein said botulinum neurotoxin is administered by injection into parotid glands and submandibular glands and wherein the ratio between the doses of botulinum neurotoxin administered to each of the parotid glands and each of the submandibular glands is between 1.45 to 1 and 1.7 to 1.

According to one embodiment of the present invention the botulinum neurotoxin is administered into parotid glands and submandibular glands in a total dose between 70 U and 110 U. In a preferred embodiment the total dose of botulinum neurotoxin administered into parotid and submandibular glands is between 75 U and 100 U.

According to one embodiment of the present invention the botulinum neurotoxin is administered into parotid glands and submandibular glands in a total dose of 75 U. In an alternative embodiment the total dose of botulinum neurotoxin administered into parotid and submandibular glands is 100 U.

Generally, the botulinum neurotoxin can be administered according to the present invention into parotid glands and submandibular glands in a total dose between 0.5 and 2.35 U/Kg body weight. In a particular preferred embodiment the botulinum neurotoxin is administered into parotid glands and submandibular glands in a total dose between 1 and 1.25 U/Kg body weight. Due to the low body weight botulinum toxin is generally administered in children as displayed in the dosing table 8. In another embodiment total dosage of up to 2.5 U/kg are administered into parotid and submandibular gland in children.

According to a further aspect of the present invention, the botulinum neurotoxin is administered in an aqueous composition having a botulinum neurotoxin concentration in the range between 45 and 55 U/mL. In a preferred embodiment of the present invention the botulinum neurotoxin is administered as aqueous composition having a botulinum neurotoxin concentration of 50 U/mL. In a particular preferred embodiment the contents of a 100 U vial will be reconstituted with a total of 2.0 mL physiological saline and the volumes administered to parotid and submandibular glands are:

Parotid gland: 0.6 ml on each side,
Submandibular gland: 0.4 ml on each side.

If several consecutive treatment cycles are envisaged the injection volumes can be reduced if dry mouth or dysphagia occurs at previous treatment cycles. This reduction is recommended at the discretion of the injector to avoid further occurrence of such side effects. If the administration of reduced botulinum neurotoxin quantities is envisaged, the injection volumes administered to parotid and submandibular glands are:

Parotid gland: 0.45 ml on each side,
Submandibular gland: 0.3 ml on each side.

The biological activity is commonly expressed in Mouse Units (U). As used herein, 1 U is the amount of neurotoxic component of the botulinum neurotoxin, which kills 50% of a specified mouse population after intraperitoneal injection, i.e. the mouse i.p. LD50. Another particular useful method for determining the biological activity of a botulinum neurotoxin is a cell-based assay as it is disclosed for example in WO2009/114748, WO 2013/049508 or WO 2014/207109. The activity results obtained with such cell-based assays correspond to the activity values obtained in the mouse i.p. LD50 assay. Activity results obtained for Botulinum serotype A formulations like commercially available Incobotulinumtoxin A (Botulinumtoxin serotype A, without complexing proteins, Xeomin®, Merz Pharmaceuticals GmbH)) or Onabotulinumtoxin A (Botulinumtoxin serotype A, with complexing proteins, Botox®, Allergan Inc.) can be converted to values for other toxins using conversion rates known to the person skilled in the art. For example, the necessary dose of AbobotulinumtoxinA A (Botulinumtoxin serotype A, with complexing proteins, Dysport®, Ipsen Biopharm Limited) can be determined by multiplication of the dose of Incobotulinumtoxin A or Onabotulinumtoxin A with a factor of 2.5 to 5. The dose for RimabotulinumtoxinB (Botulinumtoxin serotype B, Myobloc®, Solstice Neurosciences/US WorldMeds LLC) can be calculated by multiplication of the dose of Incobotulinumtoxin A or Onabotulinumtoxin A with a factor of 20 to 40.

In a further embodiment of the present invention the botulinum neurotoxin is administered in a volume of between 0.3 and 0.5 mL per injection site into the submandibular glands and in a volume of between 0.5 to 0.7 mL per injection site into the parotid glands. In a particular preferred embodiment of the present invention the botulinum neurotoxin is administered in a volume of 0.4 mL per injection site into the submandibular glands and in a volume of 0.6 mL per injection site into the parotid glands.

In a further embodiment of the present invention the botulinum neurotoxin is injected into one site of each submandibular gland on both sides of the patient. Injections are applied into the geometrically centrum of the glands, depending on the anatomical extent of the gland.

In another embodiment of the present invention the botulinum neurotoxin is injected into one site of each parotid gland on both sides of the patient. Injections are applied into the geometrical centrum of the glands, depending on the anatomical extent of the gland.

In a preferred embodiment the total dose of botulinum neurotoxin is injected into one site of each submandibular gland and into one site of each parotid gland.

One embodiment of the present invention relates to a botulinum neurotoxin for use in treating a disease or condition associated with sialorrhea or increased saliva production, wherein said botulinum neurotoxin is administered by injection into parotid glands and submandibular glands and wherein the ratio between the doses of botulinum neurotoxin administered into each of the parotid glands and each of the submandibular glands is between 1.45 to 1 and 1.7 to 1, wherein the disease or condition associated with sialorrhea or increased saliva production is associated with stroke and wherein a total dose of 100 U of the botulinum neurotoxin is injected into one site of each submandibular gland and into one site of each parotid gland.

One embodiment of the present invention relates to a botulinum neurotoxin for use in treating a disease or condition associated with sialorrhea or increased saliva production, wherein said botulinum neurotoxin is administered by injection into parotid glands and submandibular glands and wherein the ratio between the doses of botulinum neurotoxin administered into each of the parotid glands and each of the submandibular glands is 1.5 to 1, wherein the disease or condition associated with sialorrhea or increased saliva production is associated with stroke and wherein a total dose of 100 U of the botulinum neurotoxin is injected into one site of each submandibular gland and into one site of each parotid gland, in particular into the geometrical centrum of the gland, respectively.

In particular embodiments of the present invention the botulinum neurotoxin is injected into parotid glands and submandibular glands without using ultrasound guidance. In this case the target site within the gland is determined by using anatomical landmark orientation as it is well known for a person skilled in the art. The parotid gland is located inferior and anterior to the external acoustic meatus and lies posterior to the mandibular ramus and anterior to the mastoid process of the temporal bone. The gland is roughly wedge shaped when seen superficially and is also wedge shaped when seen on horizontal sections. The parotid gland can be easily palpated. To find palpable landmarks for the parotid gland one should palpate between the mandibular anterior ramus and the sternocleidomastoid muscle. Starting palpating anterior to each ear, moving to the cheek area, and then inferior to the angle of the mandible. Using the anatomic landmarks the superficial borders of the parotid gland are palpated and the botulinum neurotoxin is injected into the middle of the parotid gland. Injection can be given into the upper or lower halves of the main glandular body. A single injection point needs to be selected. The same procedure applies to the other side of the subject. The submandibular gland is located beneath the floor of the mouth below the mandibular arch next to the following anatomic structures. Lying superior to the digastric muscles, each submandibular gland is divided into superficial and deep lobes, which are separated by the mylohyoid muscle. The superficial lobe comprises most of the gland, with the mylohyoid muscle runs under it. The deep lobe is the smaller part. Although the submandibular gland is not always easily palpable, its anatomical position is well defined. The injection is given, albeit very rarely, parallel to the excretory duct. The submandibular gland will be injected by fixating the gland with two fingers in the position below the mandibula. The needle will be inserted from the upwards forwards in the direction of the mouth floor in 70-90 degree to the mandibula (Holsinger 2005, Anatomy, Function, and Evaluation of the Salivary Glands).

In other embodiments the botulinum neurotoxin is injected into parotid glands and submandibular glands using ultrasound guidance. A person skilled in the art is well aware of applying ultrasound imaging techniques to fully determine size and localization of the target area within the body of the gland. A high frequency linear transducer >7.5 MHz can be used, for example, to identify and visualize the gland [Howlett, High resolution ultrasound assessment of the parotid gland (2003) British Journal of Radiology 76, 271-277].

It is generally envisaged that the botulinum neurotoxin is injected into parotid glands and submandibular glands more than one time. In particular embodiments the botulinum neurotoxin according to the present invention is administered in consecutive treatment cycles. According to the present invention a treatment cycle is the time interval between two administrations of the botulinum neurotoxin, i.e. a treatment cycle consists of one administration of the botulinum neurotoxin and a follow-up period until the next botulinum neurotoxin injection is administered. The botulinum neurotoxin is preferably administered in at least 2, at least 3, at least 4, at least 5, at least 6, at least 7 or at least 8 treatment cycles. In one embodiment the botulinum neurotoxin is administered in 2 to 6 treatment cycles, in particular in 4 treatment cycles.

The time interval between two consecutive administrations of the botulinum neurotoxin into parotid glands and submandibular glands can vary between 10 and 20 weeks or between 12 and 20 weeks. In another embodiment the time interval between two consecutive administrations of the botulinum neurotoxin into parotid glands and submandibular glands can vary between 6 and 10 weeks. In a preferred embodiment the time interval between two consecutive administrations the botulinum neurotoxin into parotid glands and submandibular glands vary between 12 and 18 weeks, or between 14 and 18 weeks. In a most preferred embodiment the time interval is 15, 16 or 17 weeks, in particular 16 weeks.

In one embodiment of the invention the time interval remains the same between all consecutive administrations of the botulinum neurotoxin into parotid glands and submandibular glands.

In one embodiment of the present invention the botulinum neurotoxin is injected into parotid glands and submandibular glands in at least 4 consecutive treatment cycles, wherein the time interval between the consecutive administrations of the botulinum neurotoxin is 16 weeks.

Generally, there are several ways to determine the efficacy of a botulinum toxin for the treatment of a disease or condition associated with sialorrhea or increased saliva production known to the person skilled in the art. Measurements and scales for determining the efficacy of a botulinum toxin for the treatment of sialorrhea or a disease or condition associated with increased saliva production can be selected from e.g. determining unstimulated Salivary Flow Rate (uSFR), Mean Global Impression of Change Scale (GICS), Drooling Severity and Frequency Scale (DSFS), modified Radboud Oral Motor Inventory for Parkinson's Disease (mROMP), Modified Teacher's Drooling Scale (mTDS), Drooling Impact Scale (DIS), Drooling Quotient (DQ) Drooling Rating Scale (DRS) and/or UPDRS Drooling Scale.

In particular embodiments at least two of these measurements and scales can be combined for determining the efficacy of a botulinum toxin for the treatment of sialorrhea or a disease or condition associated with increased saliva production.

In one embodiment of the present invention the botulinum toxin for the treatment of sialorrhea or a disease or condition associated with increased saliva production is used in a patient having a baseline saliva production, i.e. unstimulated Salivary Flow Rate (uSFR) between 0.1-1.6 g/min. In a preferred embodiment the botulinum toxin for the treatment of sialorrhea or a disease or condition associated with increased saliva production is used in a patient having a baseline saliva production, i.e. unstimulated Salivary Flow Rate (uSFR) of more than 0.3 g/min. In another embodiment the botulinum toxin for the treatment of sialorrhea or a disease or condition associated with increased saliva production is used in a patient having at baseline a Drooling Severity and Frequency Scale (DSFS) Sum Score 6 and Severity Subscore 2 and Frequency Subscore 2. Generally the determination of the uSFR and DSFS scores is well known to a person skilled in the art. According to the present invention the uSFR is determined by the weight of collected saliva for 5 minutes using four absorptive swabs for collection. Collection of saliva is performed by placing adsorptive material into the oral cavity (e.g. four dental rolls, Salivette® or Salimetrics Oral Swabs®) for 5 minutes. The absorptive material adsorbs saliva from the closed oral cavity and weight gain of absorptive material due to the collected amount of saliva can be determined by measuring the weight of the absorptive material before and after placing it into the oral cavity. A repetition of the collection and measurement of the amount of produced saliva for 5 minutes after a pause of 30 minutes provides a second value. The average of both values guarantees the reliability of measurement results (by reducing intraindividual variability of measurements) (Jongerius P H, van Limbeek J, Rotteveel J J. Assessment of salivary flow rate: biologic variation and measure error. Laryngoscope. 2004; 114(10):1801-4).

In a further embodiment of the present invention the administration of 100 U botulinum neurotoxin reduces the uSFR by at least 25% compared to baseline within 4 weeks after administration. In a preferred embodiment the administration of 100 U botulinum neurotoxin reduces the uSFR by at least 30% (median) compared to baseline within 4 weeks after injection. In another embodiment of the present invention the administration of 100 U botulinum neurotoxin reduces the uSFR by at least 22% (median) compared to baseline within 8 weeks after administration. In a preferred embodiment the administration of 100 U botulinum neurotoxin reduces the uSFR by at least 28% (median) compared to baseline within 8 weeks after injection.

In a further embodiment of the present invention the administration of 100 U of the botulinum neurotoxin improves the Global Impression of Change Scale (GICS) score for drooling assessed by the patient by at least +0.90 score points on a 7 point Likert like scale compared to baseline drooling within 4 weeks after administration. In a preferred embodiment the administration of 100 U of the botulinum neurotoxin shows a Global Impression of Change Scale (GICS) improvement of at least +1.00 score points compared to baseline drooling within 4 weeks after injection. In another embodiment of the present invention the administration of 100 U of the botulinum neurotoxin improves drooling measured by a Global Impression of Change Scale (GICS) by at least +1.00 score points compared to baseline drooling within 8 weeks after administration. In a preferred embodiment the administration of 100 U of the botulinum neurotoxin improves drooling measured by the Global Impression of Change Scale (GICS) by at least +0.90 score points compared to baseline within 12 weeks after injection. The Global Impression of Change Scale (GICS) is determined by a Likert-like scale answering the question "Compared to how you were doing just before the last injection into your salivary gland, what is your overall impression of how you are functioning now as a result of this treatment?" with scale answers ranging from "−3 very much worse" to "+3 very much improved" (Likert, Rensis (1932). "A Technique for the Measurement of Attitudes". Archives of Psychology. 140: 1-55)).

In a further embodiment of the present invention the administration of 100 U of the botulinum neurotoxin reduces the mean Drooling Severity and Frequency Scale (DSFS) sum score by at least 0.90 score points compared to baseline within 4 weeks after administration. In a preferred embodiment the administration of 100 U of the botulinum neurotoxin reduces the mean Drooling Severity and Frequency Scale (DSFS) sum score by at least 1.20 score points compared to baseline within 4 weeks after injection. In another embodiment of the present invention the administration of 100 U of the botulinum neurotoxin reduces the mean Drooling Severity and Frequency Scale (DSFS) sum score by at least 1.50 score points compared to baseline within 8 weeks after administration. The Drooling Severity and Frequency Scale (DSFS) is determined by two subscales, a 4-point Likert scale for 'drooling frequency' and a 5-point Likert scale for 'drooling severity'. The DSFS is the sumscore of the two subscales. The evaluation refers to the time period, "over the past week". The highest possible score is 9 (Thomas-Stonell N, Greenberg J. Three treatment approaches and clinical factors in the reduction of drooling. Dysphagia. 1988; 3(2):73-8.).

Drooling Severity
1 Dry (never drools)
2 Mild (only lips wet)
3 Moderate (wet on lips and chin)
4 Severe (drool extends to clothes wet)
5 Profuse (hands, tray and objects wet)
Drooling Frequency
1 Never
2 Occasionally (not every day)
3 Frequently (part of everyday)
4 Constantly In a further embodiment of the present invention the administration of 100 U of the botulinum neurotoxin reduces the mean modified Radboud Oral Motor Inventory for Parkinson's Disease (mROMP) Saliva Control Domain sum score by at least 3.50 score points compared to baseline within 4 weeks after administration. In a preferred embodiment the administration of 100 U of the botulinum neurotoxin reduces the mean modified Radboud Oral Motor Inventory for Parkinson's Disease (mROMP) Saliva Control Domain sum score by at least 4.60 score points compared to baseline within 4 weeks after injection. In another embodiment of the present invention the administration of 100 U of the botulinum neurotoxin reduces the modified Radboud Oral Motor Inventory for Parkinson's Disease (mROMP) Saliva Control Domain sum score by at least 5.5 score points compared to baseline within 8 weeks after administration. In a preferred embodiment the administration of 100 U of the botulinum neurotoxin reduces the modified Radboud Oral Motor Inventory for Parkinson's Disease (mROMP) Saliva Control Domain sum score by at least 6.50 score points compared to baseline within 8 weeks after injection. The modified Radboud Oral Motor Inventory for Parkinson's Disease (mROMP) is determined by original ROMP Inventory [Kalf 2011, Arch. Phys. Med. Rehabil.] which is a Dutch 23-item questionnaire of 5-point Likert scales in the domains speech, swallowing and saliva control. The ROMP was modified (mROMP) to implement small changes in wording resulting from patient interviews during linguistic validation into US English. The mROMP has now 24 items with clearly distinguishable response options and a recall period of the last 7 days.

In one aspect of the present invention the botulinum neurotoxin is a botulinum neurotoxin complex. Complexes with, for example, 450 kDa or with 900 kDa are obtainable from cultures of *Clostridium botulinum*. A *Clostridium botulinum* neurotoxin complex according to the present invention comprises the neurotoxic component and non-toxic proteins. The accessory proteins embed the neurotoxic component thereby protecting it from degradation by digestive enzymes in the gastrointestinal tract without adding anything to the toxic effect.

In another aspect of the present invention the botulinum neurotoxin is the neurotoxic component of a botulinum neurotoxin complex. Generally the neurotoxic component has a molecular weight of 150 kDa. The neurotoxic component is devoid of any other protein component of the *Clostridium botulinum* neurotoxin complex.

The botulinum neurotoxin according to the present invention is selected from the group of different serotypes including botulinum neurotoxin serotype A (BoNT/A), botulinum neurotoxin serotype B (BoNT/B), botulinum neurotoxin serotype C1 (BoNT/C1), botulinum neurotoxin serotype D (BoNT/D), botulinum neurotoxin serotype E (BoNT/E), botulinum neurotoxin serotype F (BoNT/F) or botulinum neurotoxin serotype G (BoNT/G). The botulinum neurotoxin and, in particular, its light chain and heavy chain are derivable from one of the antigenically different serotypes of botulinum neurotoxins indicated above. In an aspect, said light and heavy chain of the botulinum neurotoxin are the light and heavy chain of a botulinum neurotoxin selected from the group consisting of: BoNT/A, BoNT/B, BoNT/C1, BoNT/D, BoNT/E, BoNT/F, or BoNT/G. In another aspect, a polynucleotide encoding said botulinum neurotoxin of the present invention comprises a nucleic acid sequence as shown in SEQ ID NO: 1 (BoNT/A), SEQ ID NO: 3 (BoNT/B), SEQ ID NO: 5 (BoNT/C1), SEQ ID NO: 7 (BoNT/D), SEQ ID NO: 9 (BoNT/E), SEQ ID NO: 11 (BoNT/F), or SEQ ID NO: 13 (BoNT/G). Moreover, encompassed is, in an aspect, a polynucleotide comprising a nucleic acid sequence encoding an amino acid sequence as shown in any one of SEQ ID NO: 2 (BoNT/A), SEQ ID NO: 4 (BoNT/B), SEQ ID NO: 6 (BoNT/C1), SEQ ID NO: 8 (BoNT/D), SEQ ID NO: 10 (BoNT/E), SEQ ID NO: 12 (BoNT/F), or SEQ ID NO: 14 (BoNT/G). Further encompassed is in an aspect of the means and methods of the present invention, a botulinum neurotoxin comprising or consisting of an amino acid sequence selected from the group consisting of: SEQ ID NO: 2 (BoNT/A), SEQ ID NO: 4 (BoNT/B), SEQ ID NO: 6 (BoNT/C1), SEQ ID NO: 8 (BoNT/D), SEQ ID NO: 10 (BoNT/E), SEQ ID NO: 12 (BoNT/F), and SEQ ID NO: 14 (BoNT/G).

In another aspect, the said polynucleotide encoding a botulinum neurotoxin of the present invention is a variant of the aforementioned polynucleotides comprising one or more nucleotide substitutions, deletions and/or additions which in still another aspect may result in a polypeptide having one or more amino acid substitutions, deletions and/or additions. Moreover, a variant polynucleotide of the invention shall in another aspect comprise a nucleic acid sequence variant being at least 40%, at least 50%, at least 60%, at least 70%, at least 75%, at least 80%, at least 85%, at least 90%, at least 95%, at least 96%, at least 97%, at least 98% or at least 99% identical to the nucleic acid sequence as shown in any one of SEQ ID NOs: 1, 3, 5, 7, 9, 11 or 13 or a nucleic acid sequence variant which encodes an amino acid sequence being at least 40%, at least 50%, at least 60%, at least 70%, at least 75%, at least 80%, at least 85%, at least 90%, at least 95%, at least 96%, at least 97%, at least 98% or at least 99% identical to the amino acid sequence as shown in any one of SEQ ID NOs: 2, 4, 6, 8, 10, 12, or 14. The term "identical" as used herein refers to sequence identity characterized by determining the number of identical amino acids between two nucleic acid sequences or two amino acid sequences wherein the sequences are aligned so that the highest order match is obtained. It can be calculated using published techniques or methods codified in computer programs such as, for example, BLASTP, BLASTN or FASTA (Altschul 1990, J Mol Biol 215, 403). The percent identity values are, in one aspect, calculated over the entire amino acid sequence. A series of programs based on a variety of algorithms is available to the skilled worker for comparing different sequences. In this context, the algorithms of Needleman and Wunsch or Smith and Waterman give particularly reliable results. To carry out the sequence alignments, the program PileUp (Higgins 1989, CABIOS 5, 151) or the programs Gap and BestFit (Needleman 1970, J Mol Biol 48; 443; Smith 1981, Adv Appl Math 2, 482), which are part of the GCG software packet (Genetics Computer Group 1991, 575 Science Drive, Madison, Wisconsin, USA 53711), may be used. The sequence identity values recited above in percent (%) are to be determined, in another aspect of the invention, using the program GAP over the entire sequence region with the following settings: Gap Weight: 50, Length Weight: 3, Average Match: 10.000 and Average Mismatch: 0.000, which, unless otherwise specified, shall always be used as standard settings for sequence alignments. In an aspect, each of the aforementioned variant polynucleotides encodes a polypeptide retaining one or more and, in another aspect, all of the biological properties of the respective botulinum neurotoxin, i.e. the BoNT/A, BoNT/B, BoNT/C1, BoNT/D, BoNT/E, BoNT/F or BoNT/G. Those of skill in the art will appreciate that full biological activity is maintained only after proteolytic activation, even though it is conceivable that the unprocessed precursor can exert some biological functions or be partially active. "Biological properties" as used herein refers to (a) receptor binding, (b) internalization, (c) translocation across the endosomal membrane into the cytosol, and/or (d) endoproteolytic cleavage of proteins involved in synaptic vesicle membrane fusion. In vivo assays for assessing biological activity include the mouse LD50 assay and the ex vivo mouse hemidiaphragm assay as described by Pearce et al. (Pearce 1994, Toxicol. Appl. Pharmacol. 128: 69-77) and Dressler et al. (Dressler 2005, Mov. Disord. 20:1617-1619, Keller 2006, Neuroscience 139: 629-637) or a cell-based assay as described in WO2009/114748, WO2014/207109 or WO 2013/049508. The biological activity is commonly expressed in Mouse Units (U). As used herein, 1 U is the amount of neurotoxic component of the botulinum neurotoxin, which kills 50% of a specified mouse population after intraperitoneal injection, i.e. the mouse i.p. LD50. In a further aspect, the variant polynucleotides can encode botulinum neurotoxins having improved or altered biological properties, e.g., they may comprise cleavage sites which are improved for enzyme recognition or may be improved for receptor binding or any other property specified above. A particular useful method for determining the biological activity of a botulinum neurotoxin is a cell-based assay as it is disclosed for example in WO2009/114748, WO 2013/049508 or WO 2014/207109.

Without being bound to theory it is furthermore envisaged that in particular a formulation of a botulinum neurotoxin free of complexing proteins (incobotulinumtoxin A Xeomin®), i.e. the neurotoxic component of botulinum neurotoxin being devoid of any other protein component of the *Clostridium botulinum* neurotoxin complex, in comparison to other botulinum neurotoxins with complexing proteins (Onabotulinumtoxin A, Botox®, Abobotulinumtoxin A, Dysport®, RimabotulinumtoxinB, Myobloc® or others with complexing proteins), allows a clinically reversible, functional inactivation of the cholinergic neural transmission without disrupting the intracellular structure of the salivary glands and salivary ducts. The use of the neurotoxic component of botulinum neurotoxin being devoid of any other protein component of the *Clostridium botulinum* neurotoxin complex also does not cause any physical damage in acinar cells as described in resected submandibular salivary glands of children after Botulinum toxin injections [Mosseri 2016, Otolaryngology—Head and Neck Surgery].

Generally, the blockade of nerve terminals by botulinum neurotoxins is irreversible; the clinical effects, however, are temporary as new nerve terminals sprout giving rise to new connections. Complexing proteins are regarded as biologically inactive compounds for treatment and they are generally considered to play no role in the efficacy of botulinum neurotoxins used in intramuscular injections for the treatment of spasticity, dystonia, hyperhidrosis, headache, depression, urinary detrusor spasm or in aesthetic indications like glabellar frown lines or wrinkles.

Complexing proteins are remnants of Clostridial proteins, which originate from the bacteria *Clostridium botulinum*. Those proteins are produced together with the neurotoxic component of the botulinum neurotoxin protein complex and they play a fundamental role in protection of the toxin in aggressive environments (e.g. acidic conditions in the stomach) and they help the internalization of the toxin through the epithelial barrier of the intestines. Complexing proteins consist of hemagglutinins and non-hemagglutinins and are considered as non-toxic proteins of the botulinum toxin protein complex. Hemagglutinins (HA) were described to disrupt the intercellular epithelial barrier in intestines by directly binding E-cadherin [Fujinaga 2009, *Toxicon*[ ] [Sugawara et al 2010 *J. Cell Biol.* [ ], [Lee 2014, *Science* [ ]. In salivary glands secretory epithelium, intercalated ductal epithelium and striated ductal epithelium develop from ectodermal germ lines similar to the intestinal epithelium. Of particular interest in the tight junctions of the salivary glands are the members of cadherin family, which play a role in salivary gland development, tissue organization, and cell differentiation. Epithelial (E)-cadherin is the main cell-cell adhesion molecule in epithelial tissues and is regarded as a master organizer of the epithelial phenotype. [Davies 2006, *Developmental Cell*]. In early morphogenesis, E-cadherin and $\beta$-catenin are likely to participate in salivary gland remodelling, whereas during cytodifferentiation, they form stable cell-cell contacts and may collaborate with Rho GTPases in the establishment and maintenance of salivary cell polarity" [Baker 2010, *Journal of Biomedicine and Biotechnology*. The unique intercellular structures like E-cadherins play a fundamental role in polarization of epithelial cells in intestines and salivary glands as well. Interference of E-cadherins with the complexing proteins of Botulinum toxins therefore interferes with the normal biological activity of the salivary glands. Xu and Shan, for example, demonstrated that after BoNT/A Prosigne® Hengli® (Lanzhou Biochemical Co., Gansu, China administration (i.e. a botulinum neurotoxin with complexing proteins) into rat submandibular glands, Aquaporin (AQP5) on the glandular cell membrane is downregulated, which may be a secondary effect of denervation (Xu et al. 2015 Journal of Dental Research, Shan et al. 2013 International Journal of Oral Science).

For preparing a pharmaceutical preparation comprising a botulinum neurotoxin the neurotoxin can be formulated by various techniques dependent on the desired application purposes which are known in the art. For example, the (biologically active) botulinum neurotoxin can be used in combination with one or more pharmaceutically acceptable carriers as a pharmaceutical composition. The pharmaceutically acceptable carrier(s) must be acceptable in the sense of being compatible with the other ingredients of the formulation and being not deleterious to the recipient thereof. The pharmaceutical carrier employed may include a solid, a gel, or a liquid. Exemplary of solid carriers are lactose, terra alba, sucrose, talc, gelatine, agar, pectin, acacia, magnesium stearate, stearic acid and the like. Exemplary of liquid carriers are glycerol, phosphate buffered saline solution, water, emulsions, various types of wetting agents, and the like. Suitable carriers comprise those mentioned above and others well known in the art, see, e.g., Remington's Pharmaceutical Sciences, Mack Publishing Company, Easton, Pennsylvania. In an aspect, the pharmaceutical composition can be dissolved in a diluent, prior to administration. The diluent is also selected so as not to affect the biological activity of the botulinum neurotoxin product. Examples of such diluents are distilled water or physiological saline. In addition, the pharmaceutical composition or formulation may also include other carriers or non-toxic, non-therapeutic, non-immunogenic stabilizers and the like. Thus, the formulated botulinum neurotoxin product can be present, in an aspect, in liquid or lyophilized form. In an aspect, it can be present together with glycerol, protein stabilizers (HSA) or non-protein stabilizers such as polyvinyl pyrrolidone (PVP), hyaluronic acid or free amino acids. In an aspect, suitable non-proteinaceous stabilizers are disclosed in WO 2005/007185 or WO 2006/020208. A suitable formulation for HSA-stabilized formulation comprising a botulinum neurotoxin according to the present invention is for example disclosed in U.S. Pat. No. 8,398,998 B2. The formulated botulinum neurotoxin product may be used for human or animal therapy of various diseases or disorders in a therapeutically effective dose or for cosmetic purposes.

EXAMPLES

General Procedure: A clinical trial was conducted in which 4 consecutive injections were followed by a 16 week observation period each, i.e. 4 consecutive treatment cycles. At the end of each treatment cycle, subjects were examined for eligibility to enter the next cycle. The first treatment cycle (Main Period [MP]) was conducted at two different dose levels of NT 201 (i.e. botulinum toxin serotype A without complexing proteins, Incobotulinumtoxin A) (75 U and 100 U) compared to placebo. Subjects were randomized to the respective treatment with a ratio of 2:2:1 (75 U: 100 U: placebo). The Incobotulinumtoxin A was reconstituted in physiological saline in a concentration of 50 U/mL and the patients received 30 U toxin into each parotid gland and 20 U into each submandibular gland in the 100 U dose group and 22.5 U toxin into each parotid gland and 15 U into each submandibular gland in the 75 U dose group, respectively. In both dose groups the total dose allocated to each parotid and submandibular gland was injected into one site of the respective gland. The MP was followed by 3 consecutive treatment cycles of a dose-blinded extension period where subjects received either 75 U or 100 U NT 201 in the same way as in the MP. Subjects who received placebo during MP were randomized 1:1 to receive either 75 U or 100 U NT 201 during the extension period so the overall dose randomization ratio was 1:1. The results from the MP of the trial show that both the 75 U and 100 U doses reach treatment effects of clinical relevance. They are summarized below.

Example 1: Results of the Placebo Controlled Main Period (uSFR)

Overall, 184 subjects with chronic troublesome sialorrhea were treated during the MP of the study. The study had two co-primary efficacy endpoints. One of the co-primary efficacy endpoints was the change in the unstimulated salivary flow rate (uSFR) from baseline to week 4 (see Table 1 for mean changes over time). At all time points, the uSFR was meaningfully reduced in both NT 201 treatment groups with the effect being more pronounced in the NT 201 100 U dose group as presented in FIG. 1. At Week 4, statistically significant superiority over placebo was shown for the NT 201 100 U group (p=0.004). Mean uSFR values in the NT 201 75 U with p-values less than 0.05 (Table 1) were reached at Weeks 8 and 12 (p-values: 0.022 and 0.019, respectively). The treatment effects observed in both the NT 201 100 U and NT 201 75 U groups can be considered as clinically relevant.

TABLE 1

Mean uSFR [g/min] at baseline and mean uSFR changes from baseline over time (FAS)

| Time points | Placebo | NT 201 75 U | P-value MMRM* vs. Placebo | NT 201 100 U | P-value MMRM* vs. Placebo |
|---|---|---|---|---|---|
| Baseline | 0.38 | 0.42 | | 0.40 | |
| Week 4 | −0.03 | −0.07 | 0.542 | −0.12 | 0.004 |
| Week 8 | 0.00 | −0.09 | 0.022 | −0.13 | <0.001 |
| Week 12 | 0.00 | −0.11 | 0.019 | −0.11 | 0.004 |
| Week 16 | 0.01 | −0.06 | 0.180 | −0.11 | 0.002 | uSFR = unstimulated salivary flow rate [g/min],
FAS = Full Analysis Set,
U = Unit,
MMRM = Mixed Model Repeated Measures
*MMRM uses treatment, country, gender, use of ultrasound and etiology as fixed factors and uSFR at baseline as covariate Example 2: Results of the Placebo Controlled Main Period (GICS)

The other co-primary efficacy endpoint was the improvement in global functional scale of subjects measured by the Global Impression of Change Scale (GICS) at Week 4. The GICS is a 7-point Likert scale completed by subjects answering the question "Compared to how you were doing just before the last injection into your salivary gland, what is your overall impression of how you are functioning now as a result of this treatment?" Both dose groups reached an improvement. A statistically significant difference in favor of the 100 U treatment group over the placebo was seen in Week 4 (p=0.002, Table 2, FIG. 2). The 75 U group showed numerically better results compared to placebo at Week 4, but the difference shortly missed statistical significance (p=0.055). Nevertheless, p-values of less than 0.05 were reached in both dose groups at Week 8 and Week 12 and at Week 16 in the 100 U dose group as presented in FIG. 2.

TABLE 2

Mean Subject's GICS values over time (FAS)

| Post baseline time point | Placebo | NT 201 75 U | P-value MMRM* vs. Placebo | NT 201 100 U | P-value MMRM* vs. Placebo |
|---|---|---|---|---|---|
| Week 1 (TC) | +0.47 | +0.54 | 0.689 | +0.76 | 0.065 |
| Week 2 (TC) | +0.63 | +0.72 | 0.626 | +0.91 | 0.096 |
| Week 4 | +0.47 | +0.84 | 0.055 | +1.04 | 0.002 |
| Week 8 | +0.26 | +0.89 | 0.002 | +1.13 | <0.001 |
| Week 12 | +0.36 | +0.79 | 0.035 | +1.00 | 0.001 |
| Week 16 | +0.20 | +0.34 | 0.531 | +0.72 | 0.011 |

GICS = Global Impression of Change Scale,
FAS = Full Analysis Set,
U = Unit,
MMRM = Mixed Model Repeated Measures,
TC = telephone call
*MMRM uses treatment, country, gender, use of ultrasound and etiology as fixed factors and DSFS sum score at baseline as covariate Example 3: Results of the Placebo Controlled Main Period (GICS)

The predefined response criterion for the GICS endpoint to be considered clinically meaningful improvement of drooling was at least one point improvement on the scale (minimally improved). Results of the responder analysis for all treatment groups are presented in Table 3 and FIG. 3.

TABLE 3

Response rate in Subject's GICS (FAS)

| Post baseline time point | Placebo | NT 201 75 U | P-value Fisher's exact test vs. placebo | NT 201 100 U | P-value Fisher's exact test vs. placebo |
|---|---|---|---|---|---|
| Week 1 (TC) | 36.1% | 51.4% | 0.157 | 59.5% | 0.026 |
| Week 2 (TC) | 48.6% | 62.2% | 0.215 | 66.2% | 0.095 |
| Week 4 | 44.4% | 64.4% | 0.064 | 72.6% | 0.006 |
| Week 8 | 28.6% | 68.1% | <0.001 | 76.4% | <0.001 |
| Week 12 | 38.9% | 58.6% | 0.066 | 70.8% | 0.002 |
| Week 16 | 40.0% | 41.2% | 1.000 | 59.7% | 0.065 |

FAS = full analysis set,
U = units,
TC = telephone call

The response rate of the placebo group was lower than those of both NT 201 treatment groups throughout the Main Period. It varied from 28.6% (at Week 8) to 48.6% at Week 2. In the two NT 201 groups, the maximal Subject's GICS response rate is reached at Week 8 with 68.1% in the NT 201 75 U group and 76.4% in the NT 201 100 U group. The inventors considers these rates as evidence of clinical meaningfulness of both the NT 201 75 U and 100 U dose groups.

Example 4: Results of the Placebo Controlled Main Period (DSFS)

The subjective endpoint Drooling Severity and Frequency Scale (DSFS) was also assessed. The DSFS consists of two sub-scales, a 4-point Likert scale for "drooling frequency" and a 5-point Likert scale for "drooling severity". Descriptive analyses of DSFS showed clinically relevant improvement of sialorrhea in both NT 201 treatment groups in comparison to no relevant improvement in the placebo group. Mean sum score changes from baseline over time are maximal with an improvement of −1.89 in the 100 U treatment group at Week 8 followed by −1.76 in the 75 U treatment group at Week 12 as presented in Table 4 and FIG. 4. Treatment comparison via Mixed Model Repeated Measures (MMRM) reveals p-values of <0.05 for both NT 201 groups when compared to placebo at Week 4, 8, and 12.

TABLE 4

Mean DSFS sum score at baseline and mean DSFS sum score changes from baseline over time (FAS)

| Time point | Placebo | NT 201 75 U | P-value MMRM* vs. Placebo | NT 201 100 U | P-value MMRM* vs. Placebo |
|---|---|---|---|---|---|
| Baseline | 6.97 | 6.88 | | 6.78 | |
| Week 4 | −0.53 | −1.35 | 0.002 | −1.55 | <0.001 |
| Week 8 | −0.71 | −1.60 | 0.002 | −1.89 | <0.001 |
| Week 12 | −1.03 | −1.76 | 0.008 | −1.54 | 0.030 |
| Week 16 | −0.77 | −1.07 | 0.223 | −1.10 | 0.116 |

*MMRM uses treatment, country, gender, use of ultrasound and etiology as fixed factors and DSFS sum score at baseline as covariate Example 5: Results of the Placebo Controlled Main Period (mROMP)

Finally, the modified Radboud Oral Motor Inventory for Parkinson's disease (mROMP) was assessed using the drooling subscale that includes a 9-item questionnaire of 5-point Likert scales. Both NT 201 treatment groups showed superior efficacy results in mROMP drooling in comparison to the placebo group presented in Table 5 and FIG. 5. Mean changes from baseline over time reach a maximum improvement of −6.58 in the 100 U treatment group at Week 8 and −6.77 in the 75 U treatment group at Week 12. The inventors conclude that treatment effects seen in both dose groups were superior over the effect of placebo and NT 201 effects were consistent among all measures and robust throughout the observation to confirm appropriate clinical relevance of both doses.

group at the MP were randomized within the same setting to the 75 U or 100 U dose group in a 1:1 randomization ratio for the EP. Subjects in the 75 U or 100 U dose group in MP were maintained on their dose in the EP). The mean uSFR in the EP in both NT 201 treatment groups was highest at the cycle 2 baseline and lowest at the cycle 4 baseline. Additionally, the mean uSFR at each cycle baseline were slightly higher in the NT 201 75 U group than in the NT 201 100 U group. Similar improvement of sialorrhea was observed when GICS, DSFS and mROMP were analyzed for NT201 100 U and NT201 75 U over the extension period.

TABLE 5

Change in mROMP drooling scores from study baseline to weeks 4, 8, 12 and 16 - MP (FAS, OC)

| | Placebo (N = 36) | | NT 201 75 U (N = 74) | | NT 201 100 U (N = 74) | |
|---|---|---|---|---|---|---|
| | n obs | Mean (SD) | n obs | Mean (SD) | n obs | Mean (SD) |
| | | Change from study baseline | | | | |
| Week 4 | 36 | −1.00 (4.71) | 72 | −4.63 (5.26) | 73 | −5.66 (6.16) |
| Week 8 | 35 | −1.26 (4.91) | 72 | −6.29 (6.52) | 72 | −6.58 (5.90) |
| Week 12 | 35 | −1.77 (4.54) | 70 | −6.77 (6.05) | 72 | −6.40 (5.20) |
| Week 16 | 35 | −1.46 (5.03) | 68 | −4.44 (5.56) | 70 | −4.61 (5.40) |

Score ranges from 9 (best) to 45 (worst).

Example 6: Subgroup Analysis of Results of the Placebo Controlled Main Period (mROMP)

Subgroup analysis by etiology showed that subjects with sialorrhea after stroke in the NT 201 100 U group had higher mean decreases in uSFR than subjects with sialorrhea associated with Parkinson's disease or atypical parkinsonism (Table 6).

TABLE 6

Subgroup analysis of change in uSFR from study baseline to week 4 - MP (Full Analysis Set FAS, Observed Cases OC)

| | Placebo | | NT 201 75 U | | NT 201 100 U | |
|---|---|---|---|---|---|---|
| Etiology of sialorrhea | n obs | Mean (SD) | n obs | Mean (SD) | n obs | Mean (SD) |
| Sialorrhea associated with Parkinson's disease or atypical parkinsonism | 29 | −0.04 (0.23) | 58 | −0.08 (0.15) | 58 | −0.11 (0.19) |
| Sialorrhea after stroke | 6 | 0.04 (0.12) | 13 | −0.02 (0.14) | 13 | −0.20 (0.28) |
| Sialorrhea after TBI | 1 | −0.02 (−) | 2 | −0.07 (0.37) | 2 | −0.12 (0.10) | uSFR is given in g/min
DSFS sum score ranges from 2 (best) to 9 (worst).

Example 7: Efficacy in 3 Consecutive Treatment Cycles with 16 Weeks Intervals

Efficacy results in 3 consecutive treatment cycles with 16 weeks intervals provided evidence for further improvement of sialorrhea. The change in uSFR from study baseline to all observation time points after the second injection, and the change from each injection (weeks 16, 32 and 48 after the first injection) to the respective assessment time points (weeks 20, 36 and 52 after the first injection), and to the end-of-cycle/end-of-study visits (weeks 32, 48 and 64 after the first injection) in each cycle was evaluated also.

Summary statistics for the uSFR at the cycle baselines of the extension period (EP) without placebo control group are displayed in Table 7. (Subjects randomized to the placebo

TABLE 7

Mean uSFR at all cycle baselines - EP (Safety Evaluation Set SES-EP, Observed Cases OC)

| | NT 201 75 U | | NT 201 100 U | |
|---|---|---|---|---|
| | n obs | Mean (SD) | n obs | Mean (SD) |
| Cycle 2 Baseline | 83 | 0.38 (0.25) | 89 | 0.30 (0.18) |
| Cycle 3 Baseline | 79 | 0.31 (0.22) | 84 | 0.24 (0.17) |
| Cycle 4 Baseline | 79 | 0.28 (0.24) | 78 | 0.23 (0.16) | uSFR is given in g/min.
Randomized treatment group was used.

TABLE 8

Dosing table for botulinum toxin administration into parotid and submandibular glands in children.

| Body weight [kg] | Parotid gland, each side | | Submandibular gland, each side | | Total | |
|---|---|---|---|---|---|---|
| | Total dose per gland [units] | Volume per injection [ml] | Total dose per gland [units] | Volume per injection [ml] | Total dose (both sides) [units] | Total injection volume [ml] |
| ≥12 <15 | 6 | 0.24 | 4 | 0.16 | 20 | 0.8 |
| ≥15 <19 | 9 | 0.36 | 6 | 0.24 | 30 | 1.2 |
| ≥19 <23 | 12 | 0.48 | 8 | 0.32 | 40 | 1.6 |
| ≥23 <27 | 15 | 0.60 | 10 | 0.40 | 50 | 2.0 |
| ≥27 <30 | 18 | 0.72 | 12 | 0.48 | 60 | 2.4 |
| ≥30 | 22.5 | 0.90 | 15 | 0.60 | 75 | 3.0 |

The invention claimed is:

1. A method for treating sialorrhea or increased saliva production in a patient, the method comprising administering a therapeutically effective amount of a botulinum neurotoxin by injection into the parotid glands and submandibular glands of the patient, in at least 3 consecutive treatment cycles,
   wherein the ratio between the amount of the botulinum neurotoxin administered into each of the parotid glands and each of the submandibular glands is between 1.45 to 1 and 1.7 to 1,
   wherein there is a time interval between consecutive treatment cycles of between 14 and 18 weeks,
   and wherein the botulinum neurotoxin is injected into one site of each of the submandibular glands and into one site of each of the parotid glands, and wherein the patient is a child.

2. The method according to claim 1, wherein the total dose of said botulinum neurotoxin administered into the parotid glands and submandibular glands is between 70 U and 110 U.

3. The method according to claim 1, wherein said botulinum neurotoxin is administered in an aqueous composition having a botulinum neurotoxin concentration in the range between 45 and 55 U/mL.

4. The method according to claim 1, wherein said botulinum neurotoxin is administered in 0.3 to 0.5 ml per injection site into the submandibular glands and in 0.5 to 0.7 ml per injection site into the parotid glands.

5. The method according to claim 1, wherein the botulinum neurotoxin is injected into the parotid glands and submandibular glands using ultrasound guidance.

6. The method according to claim 1, wherein said botulinum neurotoxin is a botulinum neurotoxin complex.

7. The method according to claim 1, wherein said botulinum neurotoxin is the neurotoxic component of a botulinum neurotoxin complex, wherein said neurotoxic component is devoid of any other protein component of the *Clostridium botulinum* neurotoxin complex.

8. The method according to claim 1, wherein said botulinum neurotoxin is selected from the group of botulinum neurotoxin serotypes, consisting of botulinum neurotoxin serotype A, botulinum neurotoxin serotype B, botulinum neurotoxin serotype C1, botulinum neurotoxin serotype D, botulinum neurotoxin serotype E, botulinum neurotoxin serotype F and botulinum neurotoxin serotype G.

9. The method according to claim 1, wherein the sialorrhea or increased saliva production is further associated with a disease or condition selected from the group consisting of Amyotrophic lateral sclerosis (ALS), Progressive Supranuclear Palsy, Corticobasal Degeneration, Multiple System Atrophy, stroke, traumatic brain injury (TBI), clozapine induced hypersalivation, Rett syndrome, Angelman syndrome, epileptic encephalopathy, brain tumors, total pharyngolaryngectomy, supracricoid laryngectomy, supraglottic laryngectomy, dementia, and intellectual disability.

10. The method according to claim 9, wherein the disease or condition is associated with stroke.

11. The method according to claim 1, wherein the time interval is between 15 and 17 weeks.

12. The method according to claim 11, wherein the time interval is 16 weeks.

* * * * *